US012655857B2

(12) United States Patent
Uchida et al.

(10) Patent No.: US 12,655,857 B2
(45) Date of Patent: Jun. 16, 2026

(54) INTEGRATED PUMP DEVICE

(71) Applicant: DENSO CORPORATION, Kariya-city (JP)

(72) Inventors: Kazunori Uchida, Kariya-city (JP); Tomohiro Takahashi, Kariya-city (JP); Hiroyuki Shintani, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 26 days.

(21) Appl. No.: 18/745,513

(22) Filed: Jun. 17, 2024

(65) Prior Publication Data

US 2024/0337277 A1 Oct. 10, 2024

Related U.S. Application Data

(63) Continuation of application No. PCT/JP2022/046808, filed on Dec. 20, 2022.

(30) Foreign Application Priority Data

Dec. 22, 2021 (JP) ................................ 2021-208388

(51) Int. Cl.
*F15B 15/26* (2006.01)
*F15B 13/02* (2006.01)
*F15B 15/14* (2006.01)

(52) U.S. Cl.
CPC ............ *F15B 15/26* (2013.01); *F15B 13/027* (2013.01); *F15B 15/1428* (2013.01); *F15B 2015/268* (2013.01)

(58) Field of Classification Search
CPC .......... F15B 15/26; B60T 1/062; F16H 63/34; F16H 63/3483; F16D 2127/06; F16D 63/006
See application file for complete search history.

(56) References Cited

U.S. PATENT DOCUMENTS

2015/0219205 A1* 8/2015 Ohtani ............... F16H 57/0446
192/219.4
2018/0056958 A1 3/2018 Möhlmann
2020/0103015 A1 4/2020 Okuhata
2022/0243799 A1 8/2022 Okuhata
2023/0323949 A1 10/2023 Takahashi

FOREIGN PATENT DOCUMENTS

JP 2014185651 A 10/2014
WO 2022130672 A1 6/2022

* cited by examiner

*Primary Examiner* — Nathaniel E Wiehe
*Assistant Examiner* — Daniel S Collins
(74) *Attorney, Agent, or Firm* — Nixon & Vanderhye P.C.

(57) ABSTRACT

An integrated pump device forms a module in which a motor, an oil pump rotated by a driving force of the motor, and a hydraulic parking lock actuator are integrally constructed. The hydraulic parking lock actuator operates to switch between an advance state and a retard state by hydraulic pressure supplied from the oil pump, and locks a parking lock mechanism of an automobile in the advance state and unlocks the parking lock mechanism in the retard state. The oil pump can supply oil for cooling or lubrication to an oil consumer via the hydraulic parking lock actuator.

11 Claims, 21 Drawing Sheets

FIRST EMBODIMENT

AT TIME OF BEING UNLOCKED (RETARD STATE)

INTEGRATED PUMP DEVICE

CROSS REFERENCE TO RELATED APPLICATIONS

This application is a continuation application of International Patent Application No. PCT/JP2022/046808 filed on Dec. 20, 2022, which designated the U.S. and based on and claims the benefits of priority of Japanese Patent Application No. 2021-208388 filed on Dec. 22, 2021. The entire disclosure of all of the above applications is incorporated herein by reference.

TECHNICAL FIELD

The present disclosure relates to an integrated pump device.

BACKGROUND

Conventionally, a system is known in which a motor, an electric oil pump, and an actuator that hydraulically activates a parking lock are integrated together.

SUMMARY

An object of the present disclosure is to provide an integrated pump device in which an electric oil pump and a hydraulic parking lock actuator are integrated, which prevents malfunction of the hydraulic parking lock actuator due to oil leakage from parts provided in the path to an oil consumer.

An integrated pump device of the present disclosure forms a module in which a motor, an oil pump, and a hydraulic parking lock actuator are integrated with each other.

The oil pump discharges oil drawn from an oil pan by a driving force of the motor. The hydraulic parking lock actuator operates to switch between an advance state and a retard state by hydraulic pressure supplied from the oil pump, and locks a parking lock mechanism of an automobile in the advance state and unlocks the parking lock mechanism in the retard state.

The hydraulic parking lock actuator is connected to the oil consumer via an indirect supply oil passage. The oil pump can supply oil for cooling or lubrication to the oil consumer via the hydraulic parking lock actuator.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
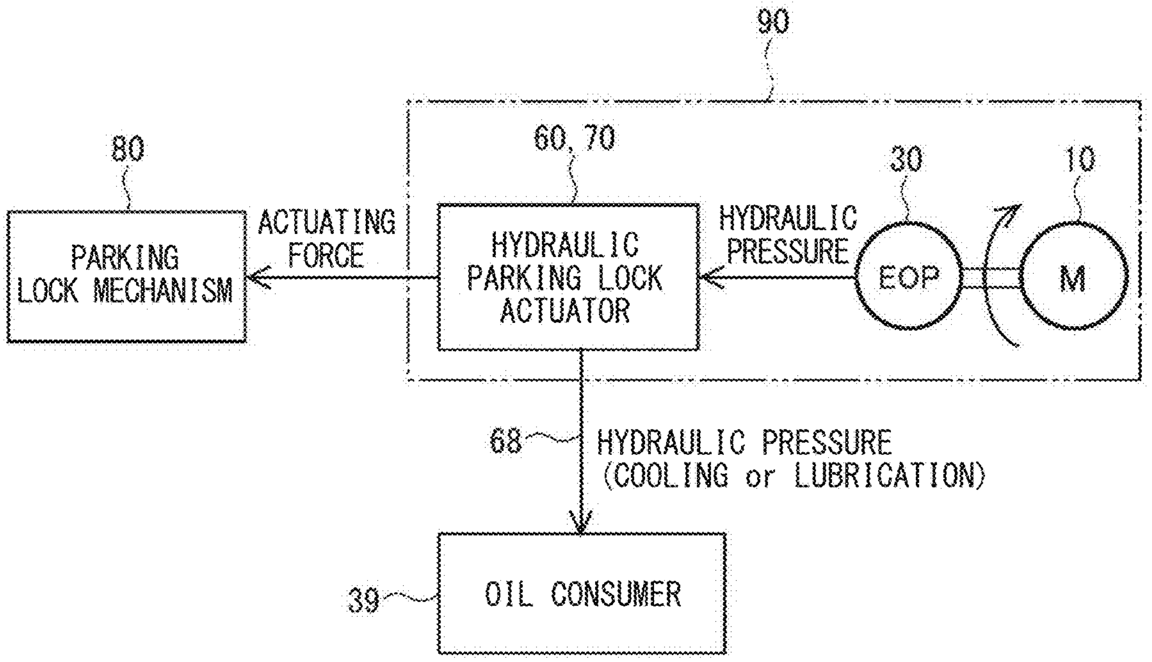
FIG. 1 is a basic configuration diagram illustrating an integrated pump device according to the present embodiment.

In an assumable example, a system is known in which a motor, an electric oil pump, and an actuator that hydraulically activates a parking lock are integrated together. For example, in a hydraulic actuation system for activating a parking lock, a direction of hydraulic pressure supply from the oil pump is switched to operate a cylinder type actuator, thereby moving the parking lock to a locked position and an unlocked position. In addition, in this hydraulic actuation system, a control valve and an orifice are provided in a supply section that branches from an oil supply pipe upstream of the actuator and connects to an oil cooling equipment and a lubricating oil supply unit for cooling oil or lubricating oil.

In the hydraulic actuation system, when the oil pump supplies hydraulic pressure in a direction to lock the parking lock, negative pressure is generated in the section to which the cooling oil or lubricating oil is supplied. When oil leakage occurs from the control valve or the orifice provided in the supply section, a supply loss of hydraulic pressure supplied from the oil pump to the actuator increases. As a result, there is a risk of malfunction of the actuator.

An object of the present disclosure is to provide an integrated pump device in which an electric oil pump and a hydraulic parking lock actuator are integrated, which prevents malfunction of the hydraulic parking lock actuator due to oil leakage, etc from parts provided in the path to an oil consumer.

An integrated pump device of the present disclosure forms a module in which a motor, an oil pump, and a hydraulic parking lock actuator are integrated with each other. For example, in a case of the integrated pump device mounted on an automobile, the term "module" does not necessarily mean a unit which is delivered to an automobile manufacturer as one component. The term "module" may be interpreted as what are delivered in parts and integrated into the automobile after being installed in the automobile.

The oil pump discharges oil drawn from an oil pan by a driving force of the motor. The hydraulic parking lock actuator operates to switch between an advance state and a retard state by hydraulic pressure supplied from the oil pump, and locks a parking lock mechanism of an automobile in the advance state and unlocks the parking lock mechanism in the retard state.

The hydraulic parking lock actuator is connected to the oil consumer via an indirect supply oil passage. The oil pump can supply oil for cooling or lubrication to the oil consumer via the hydraulic parking lock actuator.

For example, a rotary actuator in which a vane rotor housed in a vane chamber rotates, or a cylinder actuator in which a piston reciprocates within a cylinder is used as a hydraulic parking lock actuator.

In the present embodiment, the oil pump supplies oil for cooling or lubrication to the oil consumer arranged downstream of the hydraulic parking lock actuator via the hydraulic parking lock actuator. Even if oil leaks occur from components such as a control valve or orifice provided in the indirect supply oil passage, the oil pressure supply from the oil pump to the hydraulic parking lock actuator is not affected. Therefore, malfunction of the hydraulic parking lock actuator can be prevented and reliability is improved.

An integrated pump device according to the present disclosure will be described with reference to plural embodiments based on the drawings. In the multiple embodiments, substantially the same components are denoted by the same reference numerals, and a description of the same components will be omitted. The following first to eighth embodiments are collectively referred to as "present embodiment". The integrated pump device of the present embodiment is a module in which a motor, an electric oil pump, and a hydraulic parking lock actuator are integrated together.

FIG. 1 is a basic configuration diagram illustrating an integrated pump device 90 of the present embodiment. The integrated pump device 90 includes a motor 10, an oil pump 30, and hydraulic parking lock actuators 60, 70 that are integrated together. The oil pump 30 is an electric oil pump and discharges oil drawn from an oil pan by a driving force of the motor 10. In the following drawings, the motor 10 is indicated as "M" and the oil pump 30 is indicated as "EOP".

The hydraulic parking lock actuators 60, 70 are hydraulic actuators that operate a parking lock mechanism 80 of the vehicle. The hydraulic parking lock actuators 60, 70 switches between an advance state and a retard state by a hydraulic pressure created by the oil pump 30. Here, "advance state" and "retard state" are merely terms for distinguishing opposite states for convenience, and either state may be defined as the advance state or the retard state.

The hydraulic parking lock actuators 60, 70 provides an actuating force to the parking lock mechanism 80 such that the hydraulic actuator 60 locks the parking lock mechanism 80 at the advance state and unlocks the parking lock mechanism 80 at the retard state. When a shift range is operated to a P range, it corresponds to the time of being locked, and when the shift range is operated to a not-P range (i.e., not P range), it corresponds to the time of being unlocked. Here, the notP range is one range in a two-position configuration. In addition, in a configuration including a multi-shift range, a plurality of ranges other than the P range may be collectively interpreted as the notP range.

In addition, the hydraulic parking lock actuators 60, 70 are connected to the oil consumer 39 via an indirect supply oil passage 68. The oil pump 30 can supply oil for cooling or lubrication to the oil consumer 39 via the hydraulic parking lock actuators 60, 70. In the present embodiment, a motor generator is shown as an example of the oil consumer 39. In the following specification and drawings, the motor generator will be referred to as "MG". Oil is sprayed onto MG39, which serves as an "oil consumer" to cool a coil in the stator, which generates heat when current is passed through it.

Figure 2:
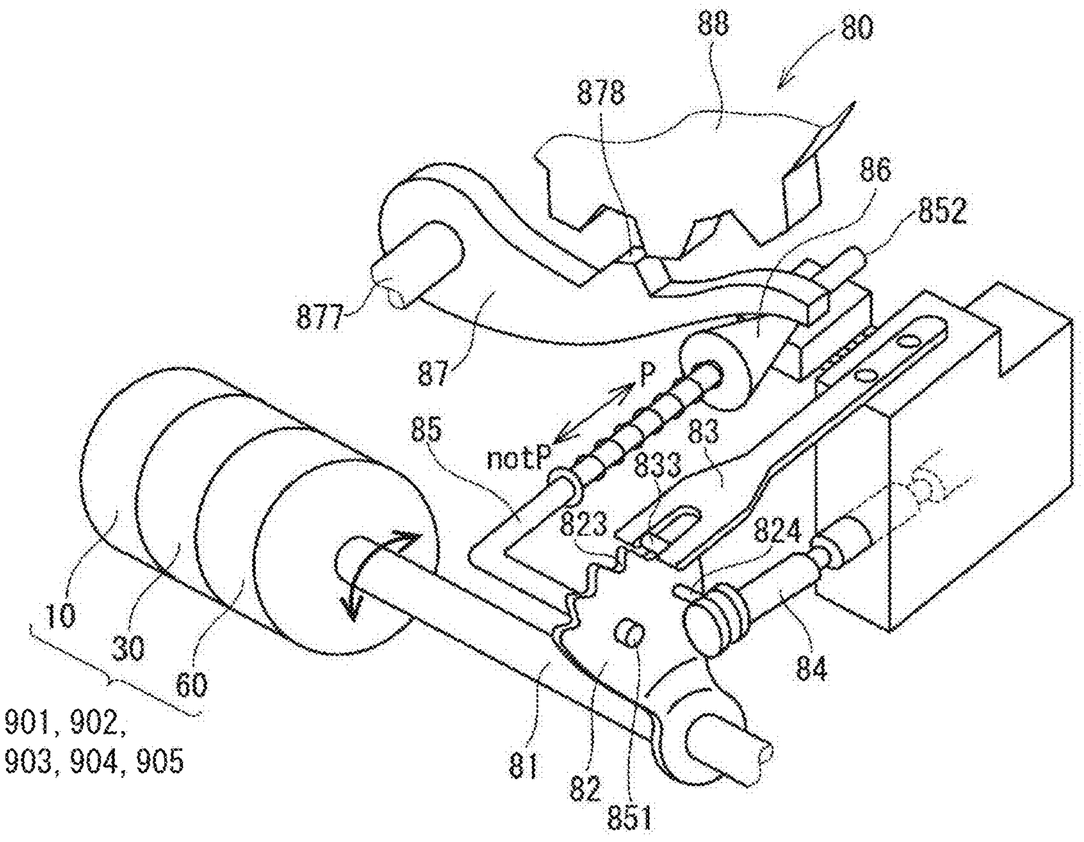
FIG. 2 is a configuration diagram of an integrated pump device and a parking lock mechanism using a rotary actuator according to first to fifth embodiments.

The "oil consumer" corresponds to the oil cooling device (16) and the oil supply point (i.e., the lubricating oil supply portion) (17) of the hydraulic actuation system disclosed in FIG. 2 of Patent Document 1 (Japanese Patent No. 6603276). In the hydraulic actuation system of Patent Document 1, a control valve (11) and an orifice (11') are provided in a cooling oil or lubricating oil supply section (13) that branches off from an oil supply pipe upstream of the actuator (5) and is connected to an oil cooling device (16) or a lubricating oil supply portion (17).

In this hydraulic actuation system, when the oil pump (1) supplies hydraulic pressure in a direction (S side) for locking the parking lock, negative pressure is generated in the cooling oil or lubricating oil supply section (13). When oil leakage occurs from the control valve (11) or the orifice (11') provided in the supply section (13), a supply loss of hydraulic pressure supplied from the oil pump (1) to the actuator (5) increases. As a result, there is a risk of malfunction of the actuator (5).

In contrast, in the present embodiment, the oil pump 30 supplies oil for cooling or lubrication to the oil consumer 39 arranged downstream of the hydraulic parking lock actuators 60, 70 via the hydraulic parking lock actuators 60, 70. Even if oil leakage occurs from components such as control valves and orifices provided in the indirect supply oil passage 68 between the hydraulic parking lock actuators 60, 70 and the oil consumer 39, the oil pressure supply from the oil pump 30 to the hydraulic parking lock actuators 60, 70 is not affected. Therefore, malfunction of the hydraulic parking lock actuators 60, 70 can be prevented and reliability is improved.

Next, a specific configuration of the integrated pump device 90 of each embodiment will be described. The reference numeral for the integrated pump device of each embodiment is denoted by the number of the embodiment as the third digit following "90". In the integrated pump devices 901 to 905 of the first to fifth embodiments, the hydraulic parking lock actuator is constituted by a rotary actuator 60. In the integrated pump devices 906 to 908 of the sixth to eighth embodiments, the hydraulic parking lock actuator is constituted by a cylinder type actuator 70. The integrated pump device 90 will be explained broadly divided into these two groups.

In the description of the hydraulic parking lock actuator in the specification, descriptions specific to the rotary or cylinder type will be referred to as a "rotary actuator 60" or a "cylinder type actuator 70". In the description of the integrated pump system using the rotary actuator, the term "hydraulic parking lock actuator 60" will be used in the description common to both systems.

[Integrated Pump Device Using Rotary Actuator]

Referring to FIGS. 2 to 14, the integrated pump devices 901 to 905 in which the hydraulic parking lock actuator is constituted by the rotary actuator 60 will be described. FIG. 2 shows the integrated pump device 901 to 905 and the parking lock mechanism 80. The integrated pump devices 901 to 905 include a motor 10, an oil pump 30, and a rotary actuator 60 that are integrated together. In FIG. 2, the motor 10, the oil pump 30, and the hydraulic actuator 60 are arranged coaxially and in series and integrally constructed, but they may be arranged in series and integrally constructed with their axes shifted, or may be arranged in parallel and integrally constructed.

The parking lock mechanism 80 includes a detent shaft 81, a detent plate 82, a detent spring 83, a switching rod 84, a parking rod 85, a cone 86, a parking lock pole 87, and a parking gear 88. The detent shaft 81 is an output shaft of the hydraulic actuator 60, and rotates in both directions within a predetermined angular range when the hydraulic actuator 60 is operated. The detent plate 82 is fixed to the detent shaft 81 and rotates together with the detent shaft 81.

The detent plate 82 has recesses 823 at portions close to the detent spring 83. When a rotational force greater than or equal to a predetermined amount is applied to the detent plate 82, the detent spring 83 is elastically deformed, and a detent roller 833 provided at a tip is fitted into one of the recesses 823. As a result, a rotation of the detent plate 82 is restricted. A pin 824 protruding from a plate surface of the detent plate 82 engages with a groove formed at a tip of the switching rod 84. Depending on the input configuration, the pin 824 and the switching rod 84 may be omitted.

The parking rod 85 is formed in a substantially L-shape, and one end 851 is fixed to the detent plate 82. The other end 852 of the parking rod 85 is provided at the cone 86. The cone 86 is formed so as to decrease in diameter as toward the other end 852. When the detent plate 82 rotates in a direction in which the detent roller 833 fits into a recess corresponding to the P range, the cone 86 moves in the direction of an arrow P in FIG. 2.

The parking lock pole 87 is in contact with a conical surface of the cone 86 and is provided so as to be swingable around a shaft part 877. A protrusion 878 that can mesh with the parking gear 88 is provided on the parking lock pole 87. When the cone 86 moves in the direction of the arrow P, the parking lock pole 87 is pushed up and the protrusion 878 and the parking gear 88 mesh with each other. As a result, the parking lock pole 87 is in a locked state. On the other hand, when the cone 86 moves in a direction of an arrow notP, the meshing between the protrusion 878 and the parking gear 88 is released. As a result, the parking lock pole 87 is in an unlocked state.

Figure 3:
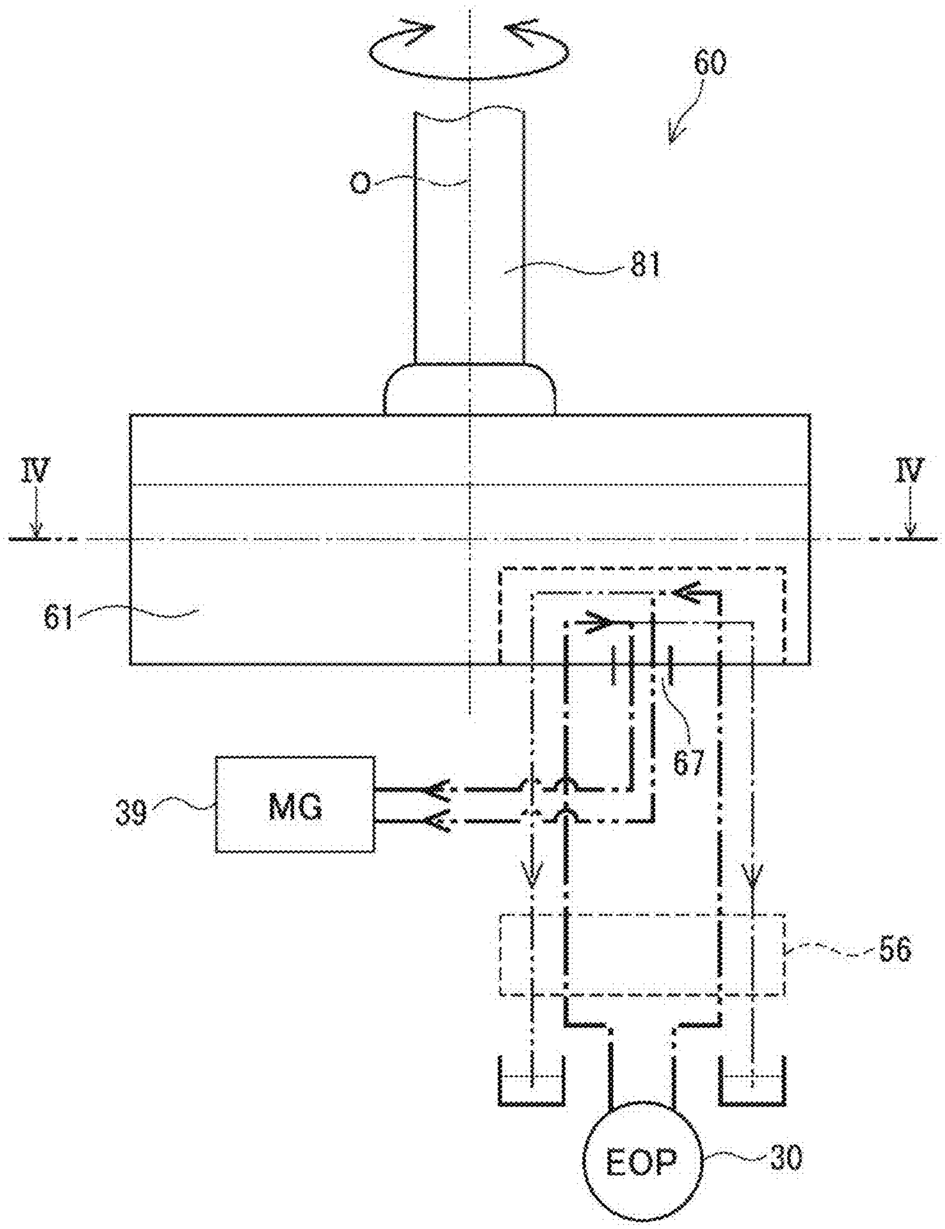
FIG. 3 is an external view of the rotary actuator.
Figure 4:
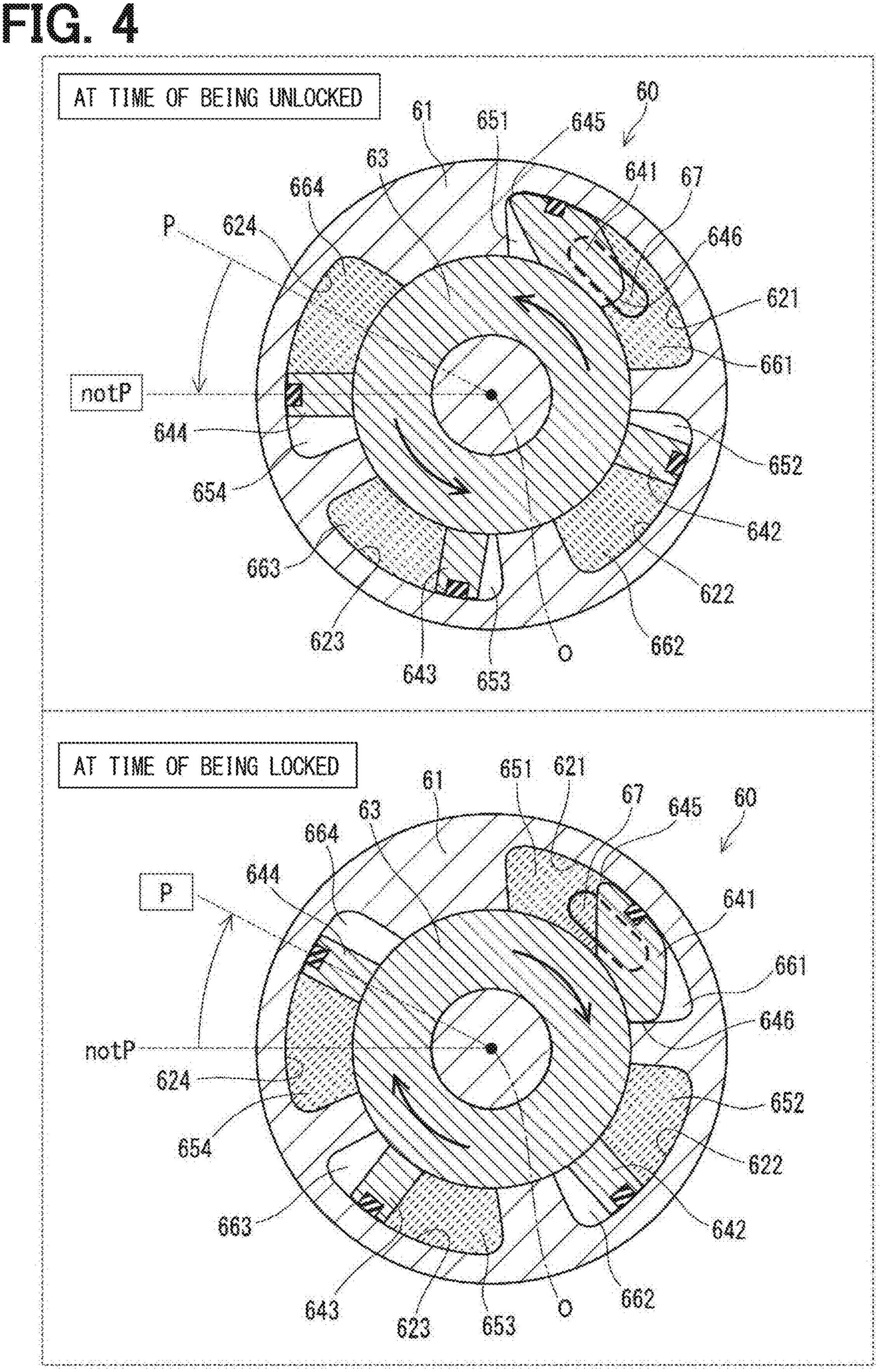
FIG. 4 is a cross-sectional view taken along a line IV-IV of FIG. 3 at the time of being unlocked (retard state) and locked (advance state)

Next, a configuration example of the rotary actuator 60 will be described with reference to FIGS. 3 and 4. An upper part of FIG. 4 shows an operation completion state at the time of being unlocked when the shift range is operated from the P range to the notP range. A lower part of FIG. 4 shows the operation completion state at the time of being locked when the shift range is operated from the notP range to the P range.

The rotary actuator 60 includes a housing 61 having a cylindrical centered on a rotation axis O and a vane rotor 63 coaxially accommodated in the housing 61. The housing 61 has, for example, four vane chambers 621 to 624 arranged in the circumferential direction. The vane chambers 621 to 624 are fan-shaped with radially outside inner walls each formed in an arc shape. In FIG. 4, lead wires of reference numerals of the vane chambers 621 to 624 are led out from the radially outside inner wall.

The vane rotor 63 has four vanes 641 to 644, for example. The four vanes 641 to 644 are provided on an outer periphery of the vane rotor 63 respectively corresponding to the vane chambers 621 to 624. One vane 641 of the four vanes 641 to 644 includes stoppers 645, 646 provided at both ends in the circumferential direction for restricting a rotation of the vane 641, and is formed larger than the other three vanes 642, 643, 644. The other three vanes 642, 643, 644 are formed relatively small in order to secure a volume of a hydraulic chamber. A sealing material is provided on a sliding portion of a radial outer wall of each of the vanes 641 to 644.

The vanes 641 to 644 are capable of rotating in a circumferential direction in the corresponding vane chambers 621 to 624. Advance chambers 651 to 654 are formed in one circumferential direction of the vanes 641 to 644 in the vane chambers 621 to 624, respectively. Retard chambers 661 to 664 are formed in the other circumferential direction of the vanes 641 to 644. Although not shown, the advance chambers 651 to 654 are connected to a common advance port via distribution oil passages. Similarly, the retard chambers 661 to 664 are connected to a common retard port via the distribution oil passages.

A vane chamber 621 in which a vane 641 operates, for example, has a communication port 67 formed in a middle part in a rotation direction between an advance chamber 651 and a retard chamber 661. As shown in FIGS. 5 to 14, the communication port 67 communicates with the indirect supply oil passage 68, and is connected to the MG 39 via the indirect supply oil passage 68. The communication port 67 may be formed not only in one vane chamber 621 but also in a plurality of vane chambers.

Hydraulic pressure is supplied to the retard chambers 661 to 664 hatched with dashed lines at the time of being unlocked shown in the upper part of FIG. 4. As a result, the vane rotor 63 rotates in a counterclockwise direction in the FIG. 4 to the retard state, and the parking lock mechanism 80 is unlocked. The Oil is discharged from the advance chambers 651 to 654. Here, the state at the time of being unlocked is also the initial state of rotation of the vane rotor 63 at the time of being locked. A two-dot chain line arrow in FIG. 3 schematically indicates a flow of the oil when shifting from a locked state to an unlocked state.

At an initial stage of rotation of the vane rotor 63, the vane 641 closes the communication port 67 in the hydraulic chamber which is the retard chamber 661, to which hydraulic pressure is supplied from the oil pump 30. After the vane rotor 63 starts rotating, the communication port 67 is opened in the retard chamber 661 at a certain rotational position. Then, at least part of the oil supplied from the oil pump 30 to the retard chamber 661 flows out from the communication port 67 and is supplied to the MG 39 via the indirect supply oil passage 68.

The hydraulic pressure is supplied to the advance chambers 651 to 654 hatched with dashed lines at the time of being locked shown in the lower part of FIG. 4. As a result, the vane rotor 63 rotates in a clockwise direction in the FIG. 4 to be in the advance state, and the parking lock mechanism 80 is locked. The oil is discharged from the retard chambers 661 to 664. Here, the state at the time of being locked is also the initial state of rotation of the vane rotor 63 at the time of being unlocked. A dashed-dotted line arrow in FIG. 3 schematically indicates the flow of oil when shifting from the unlocked state to the locked state.

At the time of being locked, at the initial stage of rotation of the vane rotor 63, the vane 641 closes the communication port 67 in the hydraulic chamber, which is the advance chamber 651, to which the hydraulic pressure is supplied from the oil pump 30. After the vane rotor 63 starts rotating, the communication port 67 is opened in the advance chamber 651 at a certain rotational position. Then, at least part of the oil supplied from the oil pump 30 to the advance chamber 651 flows out from the communication port 67 and is supplied to the MG 39 via the indirect supply oil passage 68.

First Embodiment

A first embodiment will be described with reference to FIGS. 5 and 6. The integrated pump device 901 of the first embodiment uses a directional switching valve 56 as a component of a hydraulic circuit that switches the operating direction of the hydraulic parking lock actuator 60. The rotation direction of the oil pump 30 is constant, and the oil sucked from the oil pan 31 via the oil intake passage 32 flows in one direction from the suction port 342 to the discharge port 343. A directional switching valve 56 is provided between the oil pump 30 and the hydraulic parking lock actuator 60 to switch a flow of the oil from the oil pump 30 to the advance chambers 651 to 654 and the retard chambers 661 to 664.

For example, in the two-position directional switching valve 56, the inlet port is connected to a pump oil passage 360 communicating with a discharge port 343 of the oil pump 30, and the outlet port is connected to a discharge oil passage 363 communicating with the oil pan 31. The two ports on the hydraulic parking lock actuator 60 side are respectively connected to an actuator oil passage 365 communicating with the advance chambers 651 to 654 and an actuator oil passage 366 communicating with the retard chambers 661 to 664. Two positions of the three or more positions directional switching valve 56 may be used.

Further, a consumption-side check valve 691 for preventing a backflow of oil from the MG 39 to the hydraulic parking lock actuator 60 is provided in the indirect supply oil passage 68. The consumption-side check valve 691 is not limited to one, and a plurality of consumption check valves may be provided.

Figure 5:
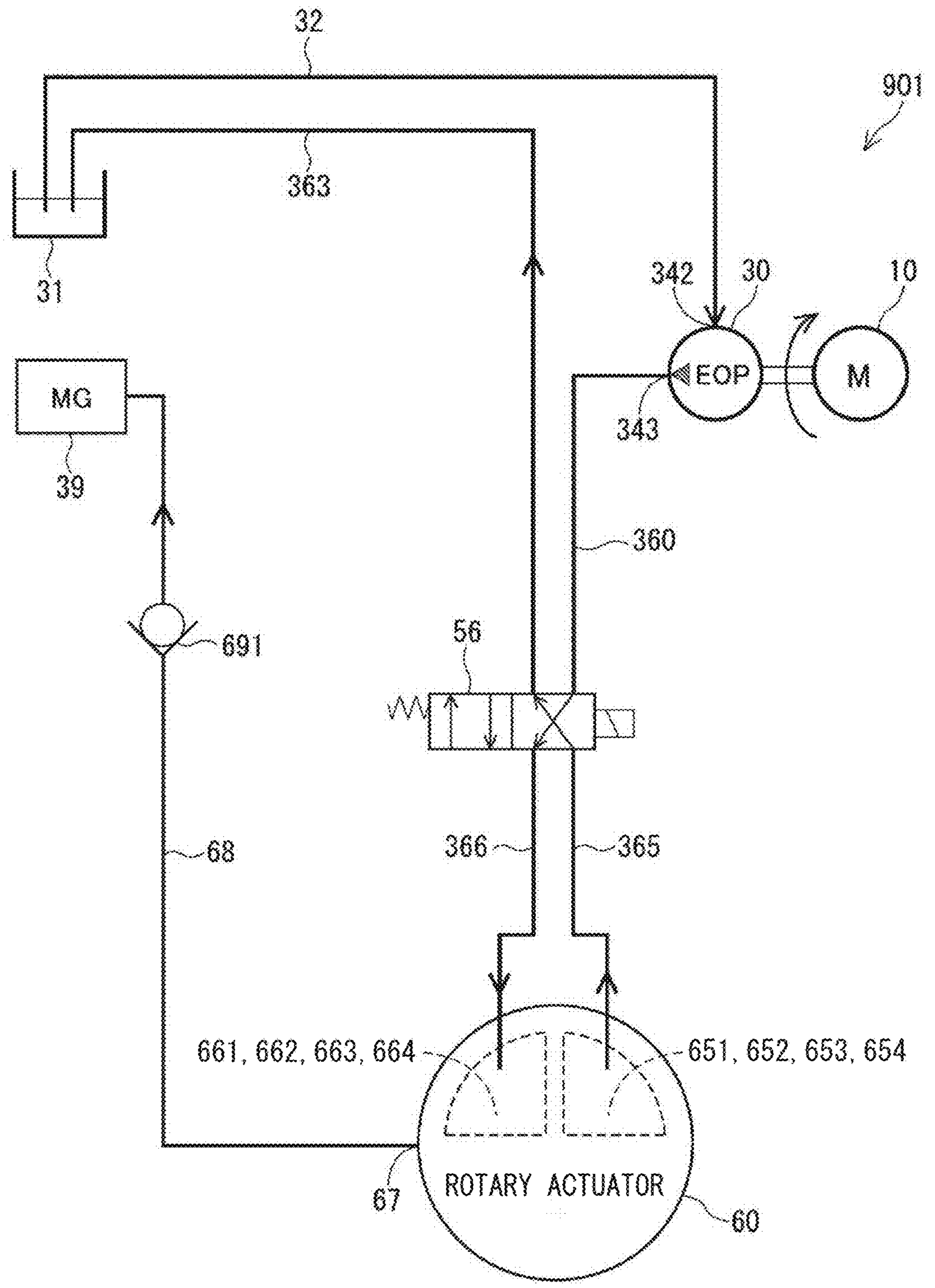
FIG. 5 is a diagram showing a hydraulic path at the time of being unlocked (retard state) according to the first embodiment.

At the time of being unlocked shown in FIG. 5, the directional switching valve 56 is operated to a position where the retard chambers 661 to 664 communicate with the pump oil passage 360 and the advance chambers 651 to 654 communicate with the discharge oil passage 363. The oil discharged from the discharge port 343 of the oil pump 30 is supplied to the retard chambers 661 to 664 via the pump oil passage 360 and the actuator oil passage 366. In addition, the oil is returned from the advance chambers 651 to 654 to the oil pan 31 via the actuator oil passage 365 and the discharge oil passage 363. The hydraulic parking lock actuator 60 is in the retard state, and the parking lock mechanism 80 is unlocked.

Furthermore, at the time of being unlocked, the communication port 67 in the retard chamber 661 is closed at the initial stage of rotation of the vane rotor 63. After the vane rotor 63 starts to rotate, the communication port 67 in the retard chamber 661 is opened. Therefore, oil for cooling or lubrication is supplied to the MG 39 from the oil pump 30 via the retard chamber 661 of the hydraulic parking lock actuator 60 and further via the indirect supply oil passage 68.

Figure 6:
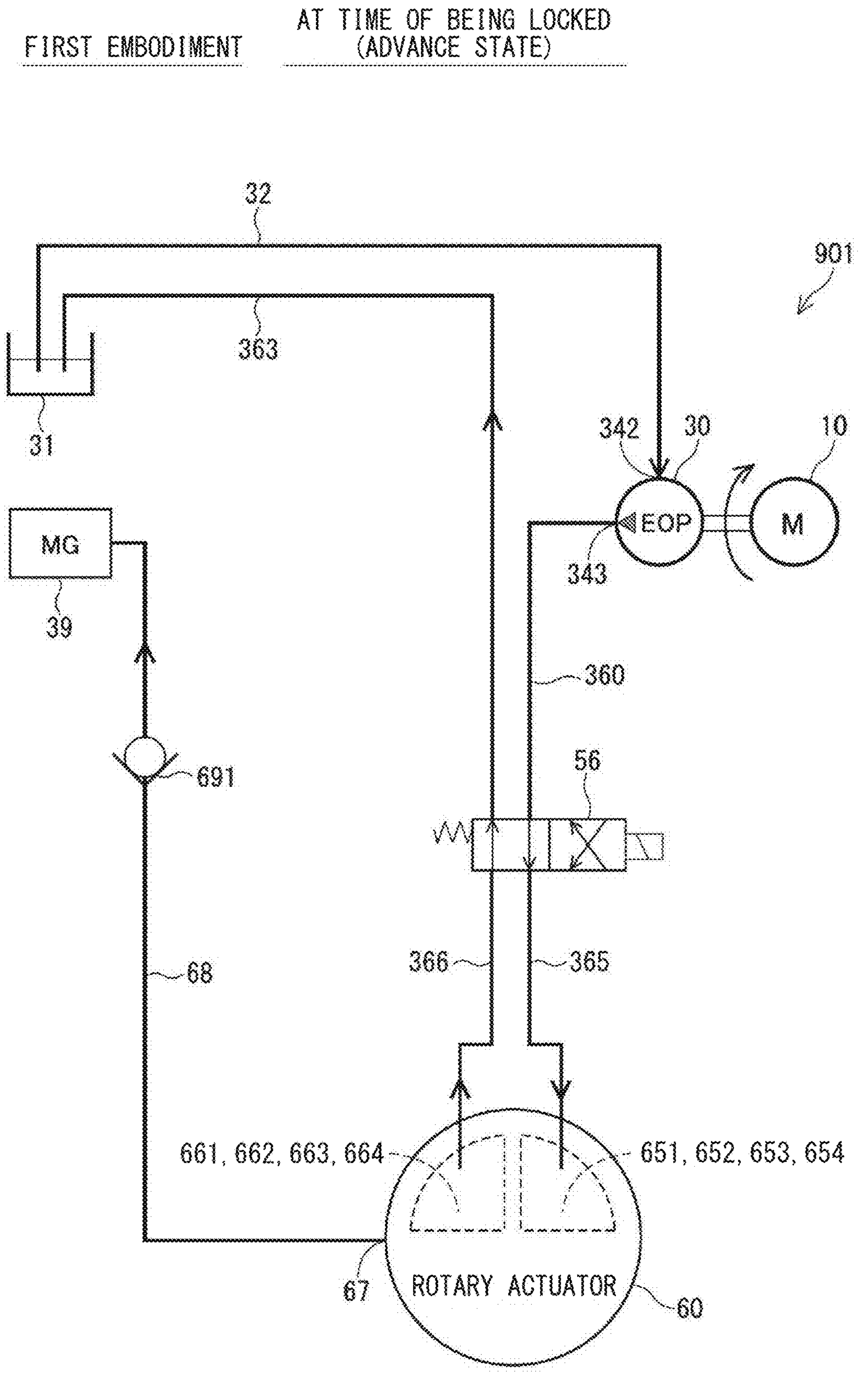
FIG. 6 is a diagram showing a hydraulic path at the time of being locked (advance state) according to the first embodiment.

At the time of being locked shown in FIG. 6, the directional switching valve 56 is operated to a position where the advance chambers 651 to 654 communicate with the pump oil passage 360 and the retard chambers 661 to 664 communicate with the discharge oil passage 363. The oil discharged from the discharge port 343 of the oil pump 30 is supplied to the advance chambers 651 to 654 via the pump oil passage 360 and the actuator oil passage 365. In addition, the oil is returned from the retard chambers 661 to 664 to the oil pan 31 via the actuator oil passage 366 and the discharge oil passage 363. The hydraulic parking lock actuator 60 is in the advance state, and the parking lock mechanism 80 is locked.

Furthermore, at the time of being locked, the communication port 67 in the advance chamber 651 is closed at the initial stage of rotation of the vane rotor 63. After the vane rotor 63 starts to rotate, the communication port 67 in the advance chamber 651 is opened. Therefore, oil for cooling or lubrication is supplied to the MG 39 from the oil pump 30 via the advance chamber 651 of the hydraulic parking lock actuator 60 and further via the indirect supply oil passage 68.

In the first embodiment, the switching of the operation direction of the hydraulic parking lock actuator 60 can be reliably performed by using the directional switching valve 56.

Furthermore, even if oil leakage occurs from the consumption side check valve 691 provided in the indirect supply oil passage 68, the supply of oil pressure from the oil pump 30 to the hydraulic parking lock actuator 60 is not affected. Therefore, malfunction of the hydraulic parking lock actuator 60 can be prevented and reliability is improved. This effect is similar to that of the second and third embodiments.

Second Embodiment

A second embodiment will be described with reference to FIGS. 7 and 8. An integrated pump device 902 of the second embodiment differs from the first embodiment in a configuration of a hydraulic circuit for switching the operating direction of the hydraulic parking lock actuator 60. An oil pump 30 can rotate in both a forward direction and a reverse direction together with rotation of a motor 10, and a suction port and a discharge port are alternatively switched in accordance with a change of a rotation direction of the oil pump 30. That is, a forward suction port 342 is a reverse discharge port, and a reverse suction port 343 is a forward discharge port. Hereinafter, regarding the rotation direction of the oil pump 30 which can rotate in both a forward direction and a reverse direction, the rotation direction in the first embodiment, that is, the rotation direction in which oil is discharged from the discharge port 343 during forward rotation, is defined as forward rotation.

A selective shutoff valve 59 is provided in a forward oil intake passage 32 and the reverse oil intake passage 33. The selective shutoff valve 59 allows the oil to flow in the forward oil intake passage 32 and blocks the oil from flowing in the reverse oil intake passage 33 while the oil pump 30 rotates in the forward direction, and allows the oil to flow in the reverse oil intake passage 33 and blocks the oil from flowing in the forward oil intake passage 32 while the oil pump 30 rotates in the reverse direction. The selective shutoff valve 59 may be integrated as a module into the integrated pump device 902.

Figure 7:
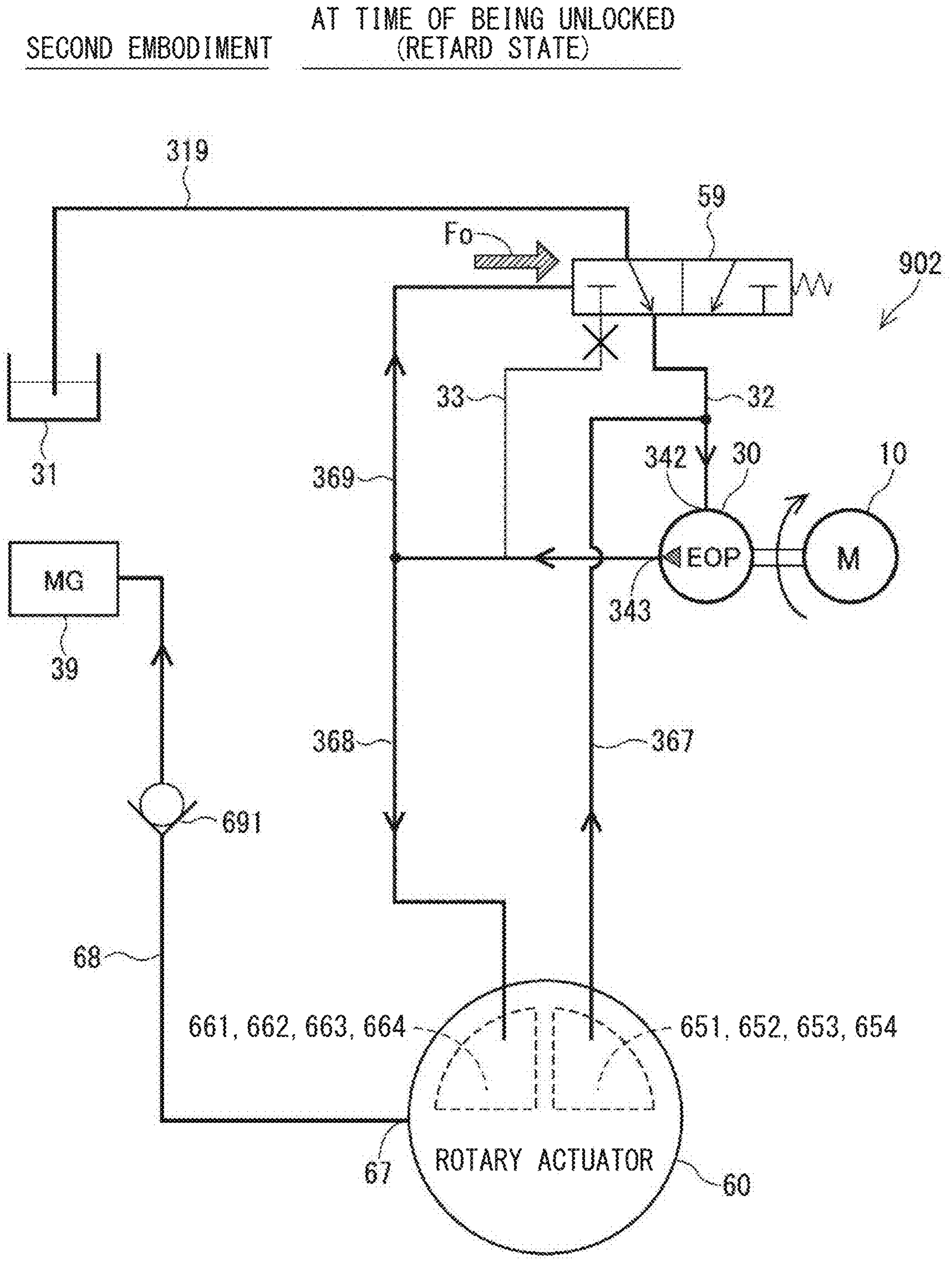
FIG. 7 is a diagram showing a hydraulic path at the time of being unlocked (retard state) according to the second embodiment.
Figure 8:
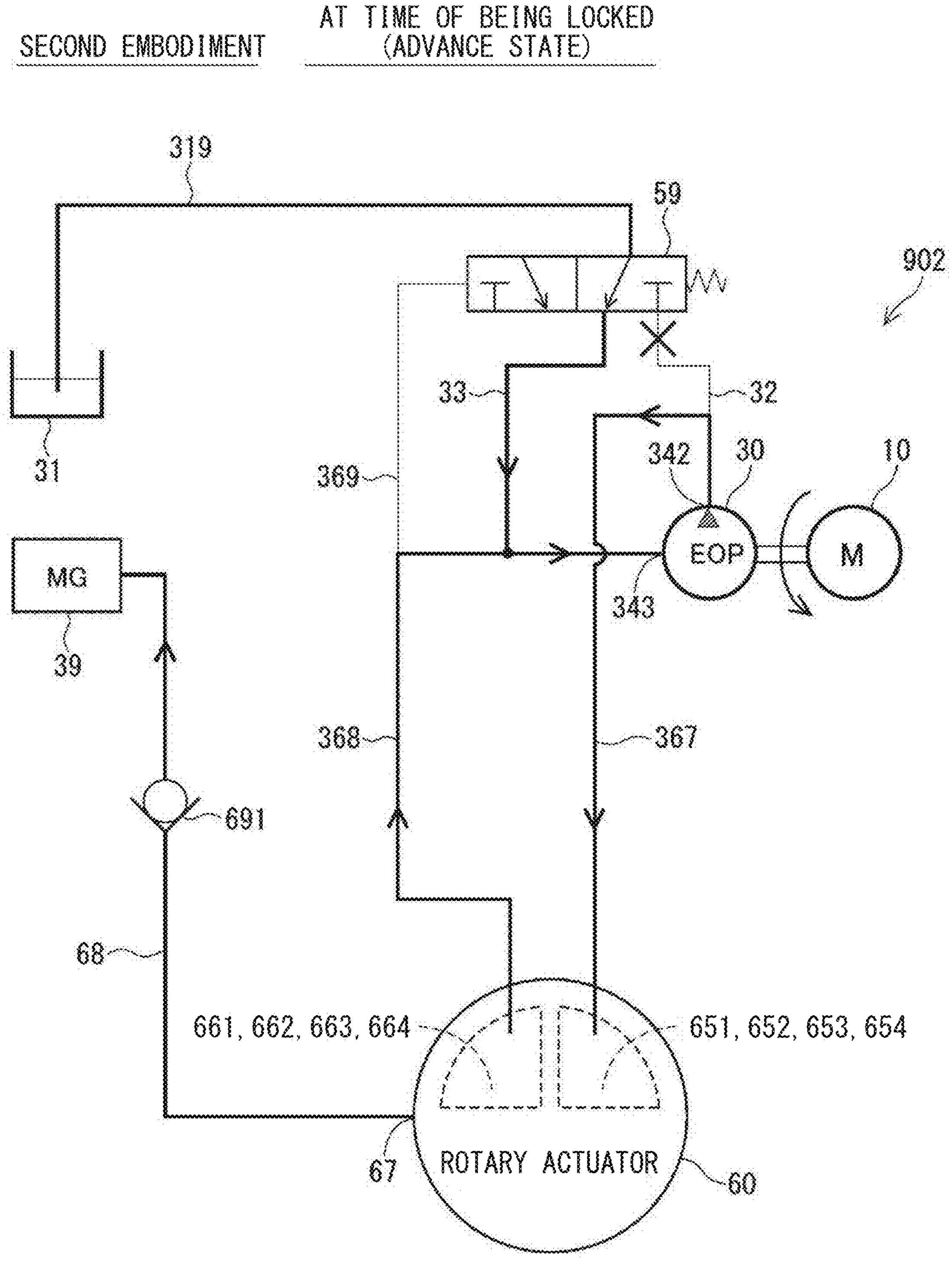
FIG. 8 is a diagram showing a hydraulic path at the time of being locked (advance state) according to the second embodiment.

The selective shutoff valve 59 shown in FIGS. 7 and 8 is configured as a spool valve type hydraulic switching valve in which the position of the spool is changed over by an operating pressure. In the spool valve type selective shutoff valve 59, the inlet port is connected to a common suction oil passage 319 communicating with the oil pan 31, and the two outlet ports are connected to the forward oil intake passage 32 and the reverse oil intake passage 33, respectively. The spool moves and switches the flow path depending on the balance between the force due to the operating pressure acting on one end of the spool and the spring force acting on the other end.

The selective shutoff valve 59 is not limited to a spool valve type, and may be an electromagnetic valve that switches the flow path by energizing a solenoid. Further, the consumption side check valve 691 is provided in the indirect supply oil passage 68 extending from the communication port 67 of the hydraulic parking lock actuator 60 to the MG 39.

At the time of being unlocked as shown in FIG. 7, when the oil pump 30 rotates forward, the oil discharged from a forward discharge port 343 is supplied to retard chambers 661 to 664 of the hydraulic parking lock actuator 60 via an actuator oil passage 368. In addition, the operating pressure Fo introduced into the operating pressure oil passage 369 acts on one end of the spool of the selective shutoff valve 59, pushing the spool back to the right in the figure against the spring force. As a result, the oil is sucked from the oil pan 31 through the common suction oil passage 319 and the forward oil intake passage 32 to the forward suction port 342.

At this time, the selective shutoff valve 59 closes the reverse oil intake passage 33 as indicated by "x" mark. In addition, the oil is returned to the forward oil intake passage 32 from the advance chambers 651 to 654 of the hydraulic actuator 60 via an actuator oil passage 367. The hydraulic parking lock actuator 60 is in the retard state, and the parking lock mechanism 80 is unlocked.

Furthermore, at the time of being unlocked, the communication port 67 in the retard chamber 661 is closed at the initial stage of rotation of the vane rotor 63. After the vane rotor 63 starts to rotate, the communication port 67 in the retard chamber 661 is opened. Therefore, oil for cooling or lubrication is supplied to the MG 39 from the oil pump 30 via the retard chamber 661 of the hydraulic parking lock actuator 60 and further via the indirect supply oil passage 68.

At the time of being locked shown in FIG. 8, when the oil pump 30 rotates in the reverse direction, the operating pressure Fo applied to the spool of the selective shutoff valve 59 decreases, and the spool moves to the left in the figure due to the spring force. As a result, the oil is sucked from the oil pan 31 through the common suction oil passage 319 and the reverse oil intake passage 33 to the reverse suction port 343. The oil discharged from the reverse discharge port 342 is supplied to the advance chambers 651 to 654 of the hydraulic actuator 60 via the actuator oil passage 367.

At this time, the selective shutoff valve 59 closes the forward oil intake passage 32 as indicated by "x" mark. In addition, the oil is returned to the reverse oil intake passage 33 from the retard chambers 661 to 664 of the hydraulic actuator 60 via the actuator oil passage 368. The hydraulic parking lock actuator 60 is in the advance state, and the parking lock mechanism 80 is locked.

Furthermore, at the time of being locked, the communication port 67 in the advance chamber 651 is closed at the initial stage of rotation of the vane rotor 63. After the vane rotor 63 starts to rotate, the communication port 67 in the advance chamber 651 is opened. Therefore, oil for cooling or lubrication is supplied to the MG 39 from the oil pump 30 via the advance chamber 651 of the hydraulic parking lock actuator 60 and further via the indirect supply oil passage 68.

In the second embodiment, the flow of oil from the oil pump 30 to the advance chambers 651 to 654 or the retard chambers 661 to 664 is switched by switching the oil pump 30 between forward and reverse rotation and the associated switching of the selective shutoff valve 59. Therefore, the directional switching valve 56 can be eliminated compared to the first embodiment.

Third Embodiment

A third embodiment will be described with reference to FIGS. 9 and 10. An integrated pump device 903 of the third embodiment differs from the first and second embodiments in a configuration of a hydraulic circuit for switching the operating direction of the hydraulic parking lock actuator 60. An oil pump 30 can rotate in both a forward direction and a reverse direction together with rotation of a motor 10, and a suction port and a discharge port are alternatively switched in accordance with a change of a rotation direction of the oil pump 30 similarly to the second embodiment.

The forward suction port 342 is connected to advance chambers 651 to 654 of the hydraulic actuator 60 via the actuator oil passage 367. The forward oil intake passage 32 connected to the forward suction port 342 is provided with a suction check valve 57 that prevents a reverse flow from the oil pump 30 to the oil pan 31.

The reverse suction port 343 is connected to the retard chambers 661 to 664 of the hydraulic actuator 60 via the actuator oil passage 368. A suction check valve 58 that prevents a reverse flow from the oil pump 30 to the oil pan 31 is provided at the reverse oil intake passage 33 connected to the reverse suction port 343. The suction check valves 57, 58 are not limited to one in each of the oil intake passages 32, 33 and a plurality of suction check valves may be provided in each of the oil intake passages 32, 33.

In the illustrated example, the forward oil intake passage 32 and the reverse oil intake passage 33 branch off from the common suction oil passage 319 connected to the oil pan 31. Alternatively, the forward oil intake passage 32 and the reverse oil intake passage 33 may be independently connected to the oil pan 31. Further, the consumption side check valve 691 is provided in the indirect supply oil passage 68 extending from the communication port 67 of the hydraulic parking lock actuator 60 to the MG 39.

Figure 9:
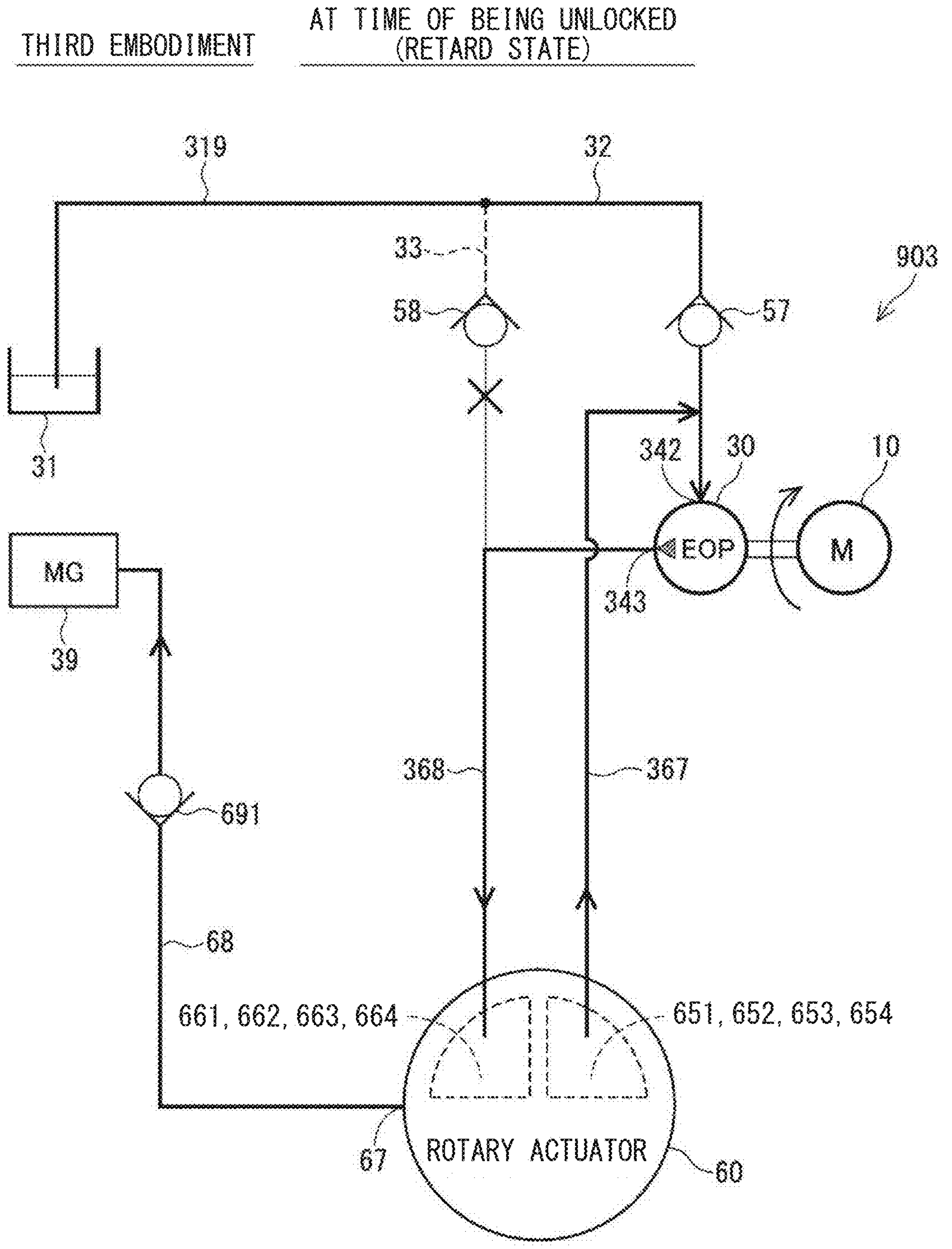
FIG. 9 is a diagram showing a hydraulic path at the time of being unlocked (retard state) according to the third embodiment.

At the time of being unlocked shown in FIG. 9, when the oil pump 30 rotates forward, the oil is drawn from the oil pan 31 into the forward suction port 342 via the forward oil intake passage 32. The oil discharged from the forward discharge port 343 is supplied to the retard chambers 661 to 664 of the hydraulic parking lock actuator 60 via the actuator oil passage 368.

At this time, the suction check valve 58 prevents the oil from flowing back to the oil pan 31 through the reverse oil intake passage 33, as indicated by "x". In addition, the oil is returned to the forward oil intake passage 32 from the advance chambers 651 to 654 of the hydraulic actuator 60 via the actuator oil passage 367. The hydraulic parking lock actuator 60 is in the retard state, and the parking lock mechanism 80 is unlocked.

Furthermore, at the time of being unlocked, the communication port 67 in the retard chamber 661 is closed at the initial stage of rotation of the vane rotor 63. After the vane rotor 63 starts to rotate, the communication port 67 in the retard chamber 661 is opened. Therefore, oil for cooling or lubrication is supplied to the MG 39 from the oil pump 30 via the retard chamber 661 of the hydraulic parking lock actuator 60 and further via the indirect supply oil passage 68.

Figure 10:
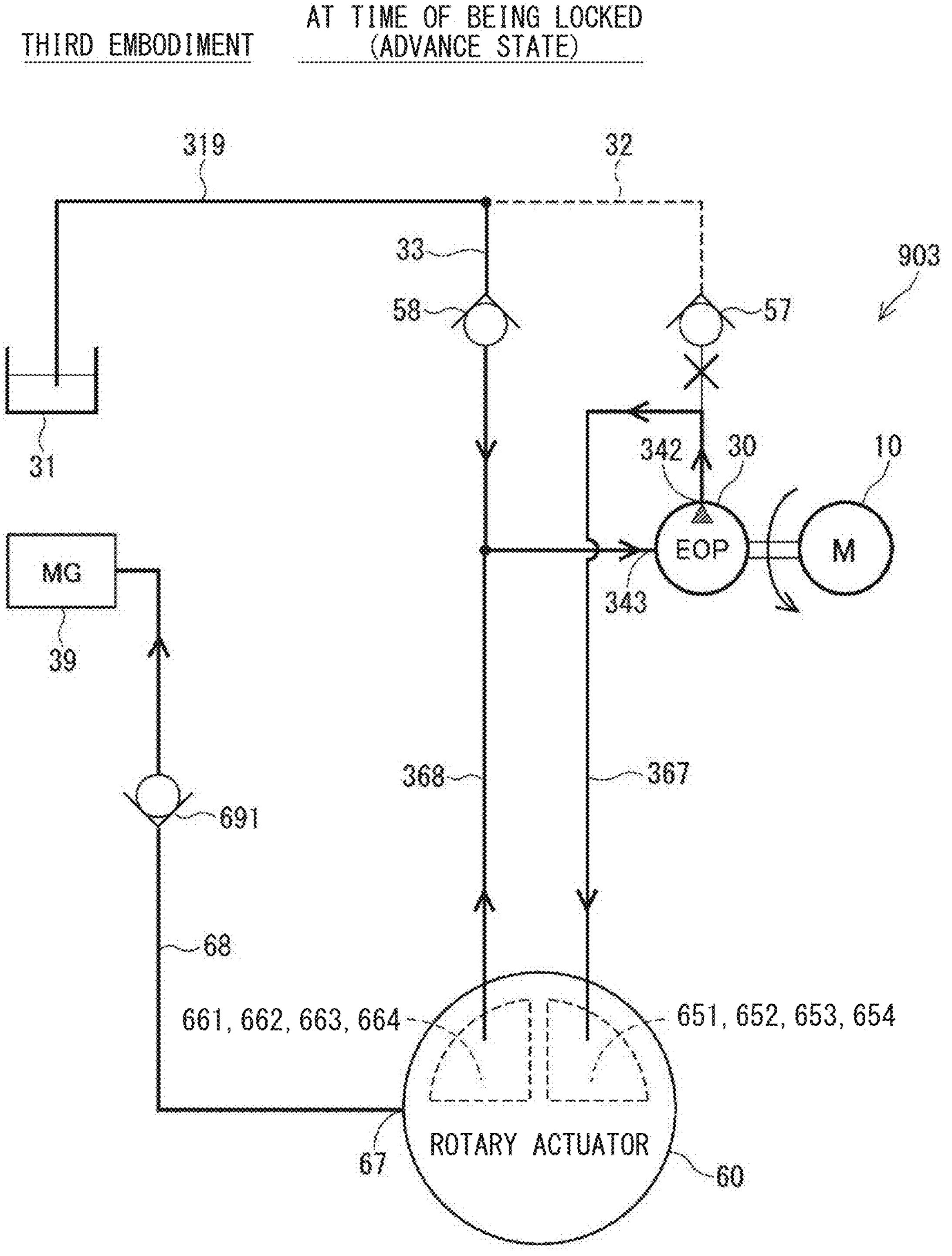
FIG. 10 is a diagram showing a hydraulic path at the time of being locked (advance state) according to the third embodiment.
Figure 11:
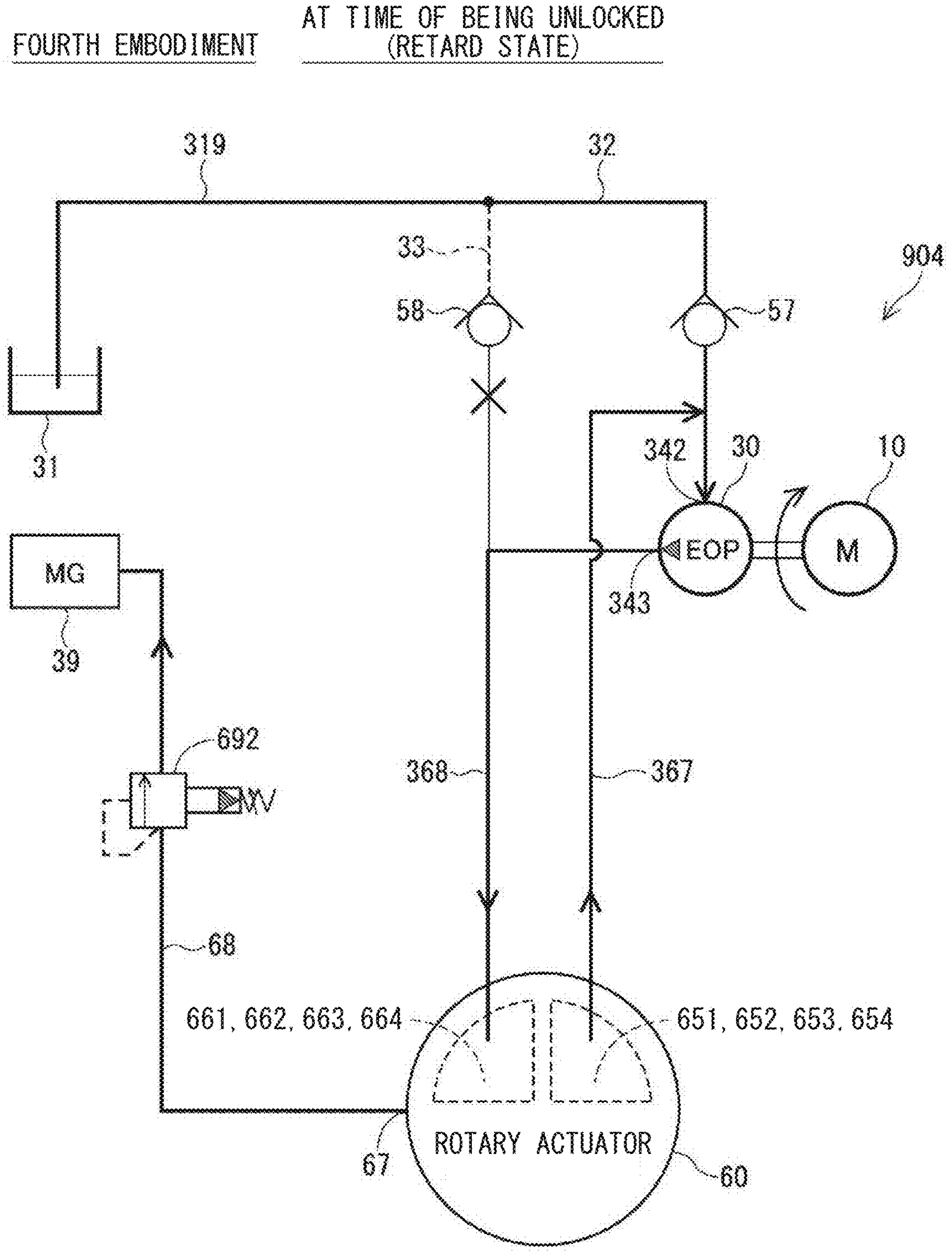
FIG. 11 is a diagram showing a hydraulic path at the time of being unlocked (retard state) according to the fourth embodiment.
Figure 12:
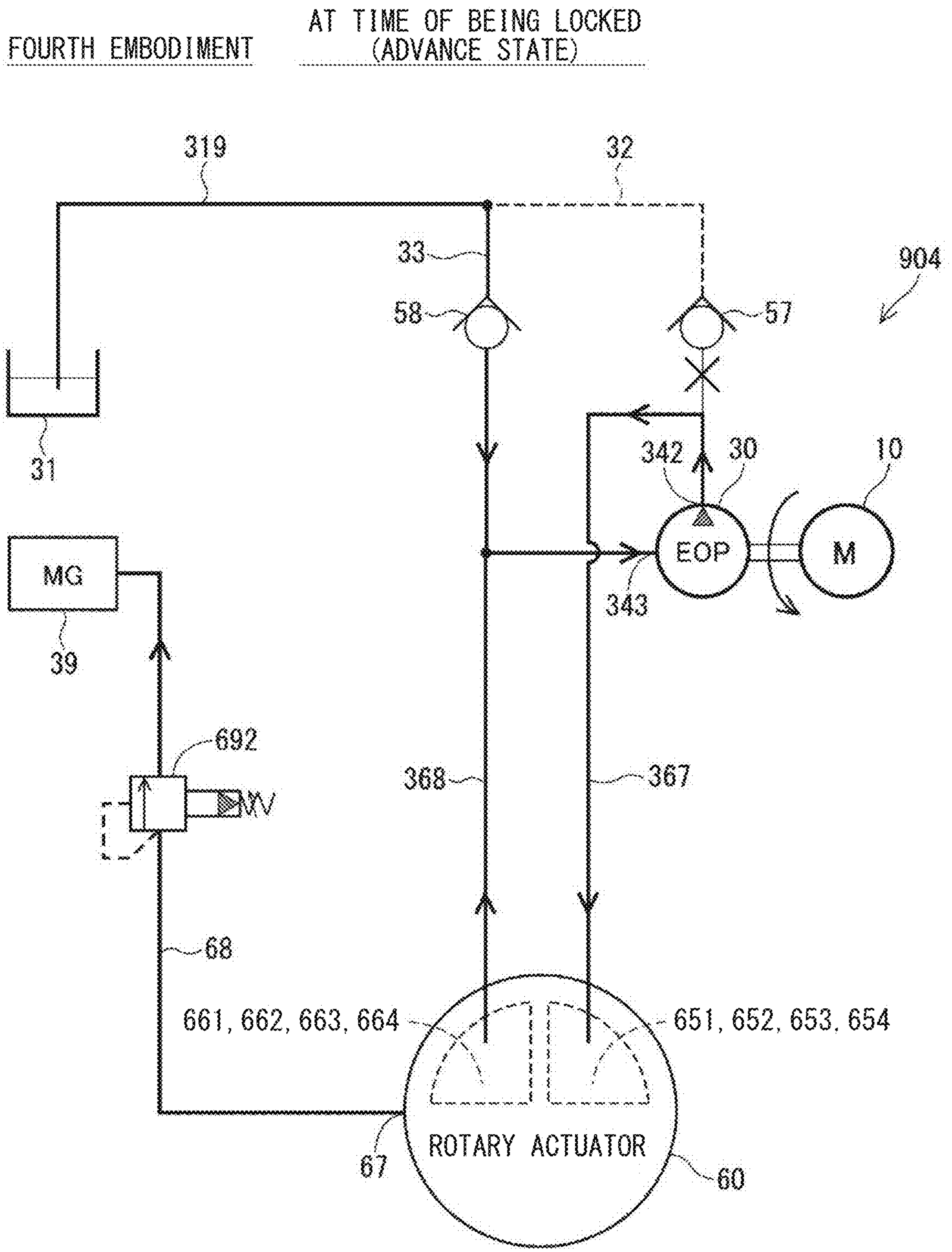
FIG. 12 is a diagram showing a hydraulic path at the time of being locked (advance state) according to the fourth embodiment.
Figure 13:
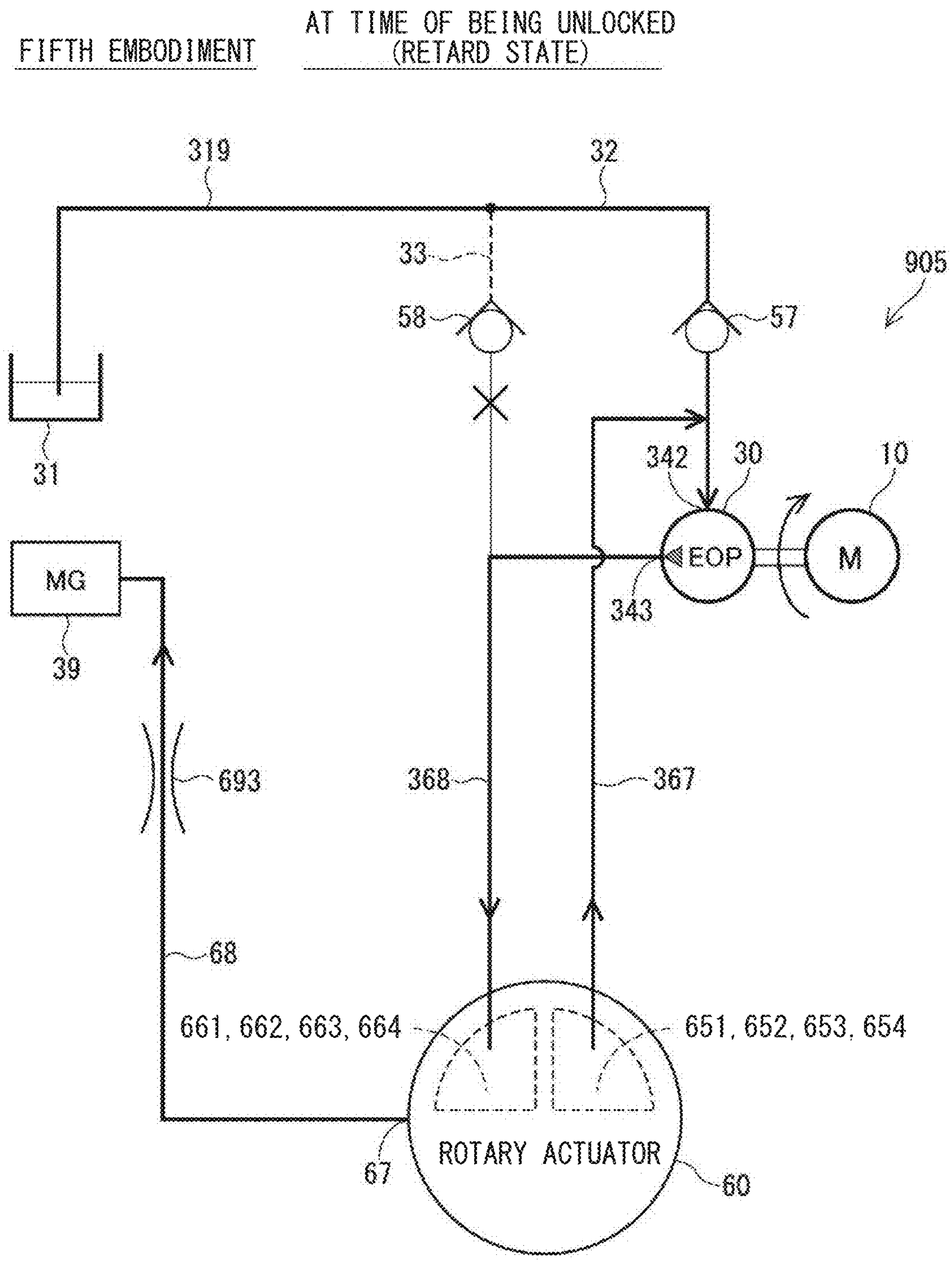
FIG. 13 is a diagram showing a hydraulic path at the time of being unlocked (retard state) according to the fifth embodiment.
Figure 14:
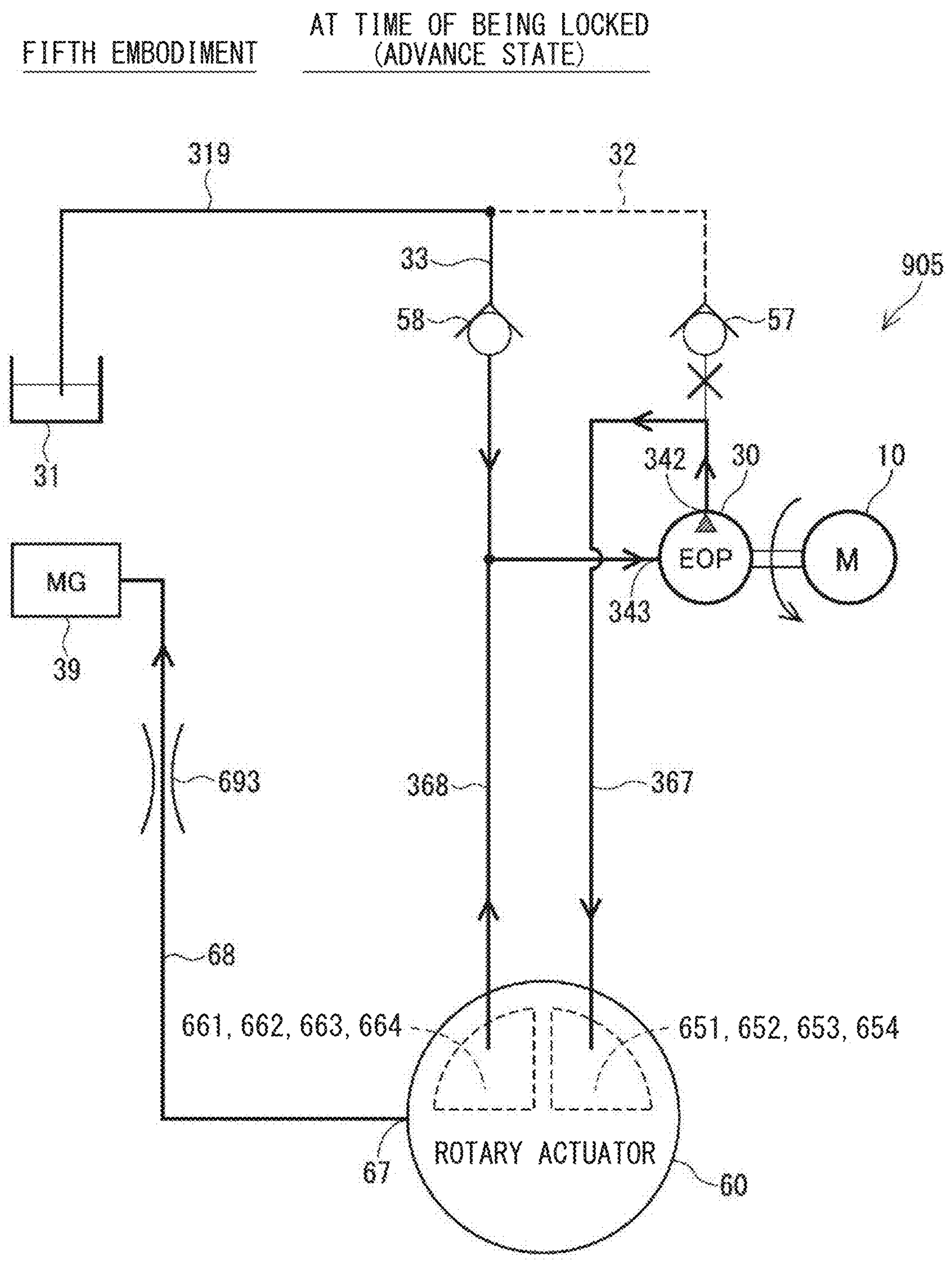
FIG. 14 is a diagram showing a hydraulic path at the time of being locked (advance state) according to the fifth embodiment.

At the time of being locked shown in FIG. 10, when the oil pump 30 reverses, the oil is drawn from the oil pan 31 into the reverse suction port 343 via the reverse oil intake passage 33. The oil discharged from the reverse discharge port 342 is supplied to the advance chambers 651 to 654 of the hydraulic parking lock actuator 60 via the actuator oil passage 367.

At this time, the suction check valve 57 prevents the oil from flowing back to the oil pan 31 through the forward oil intake passage 32, as indicated by "x". In addition, the oil is returned to the reverse oil intake passage 33 from the retard chambers 661 to 664 of the hydraulic actuator 60 via the actuator oil passage 368. The hydraulic parking lock actuator 60 is in the advance state, and the parking lock mechanism 80 is locked.

Furthermore, at the time of being locked, the communication port 67 in the advance chamber 651 is closed at the initial stage of rotation of the vane rotor 63. After the vane rotor 63 starts to rotate, the communication port 67 in the advance chamber 651 is opened. Therefore, oil for cooling or lubrication is supplied to the MG 39 from the oil pump 30 via the advance chamber 651 of the hydraulic parking lock actuator 60 and further via the indirect supply oil passage 68.

In the third embodiment, the flow of oil from the oil pump 30 to the advance chambers 651 to 654 or the retard chambers 661 to 664 is switched by switching the oil pump 30 between forward and reverse rotation. Therefore, the directional switching valve 56 can be eliminated compared to the first embodiment.

Fourth and Fifth Embodiments

The fourth and fifth embodiments will be described with reference to FIGS. 11 to 14. In the integrated pump device 904 of the fourth embodiment, a supply switching valve 692 that switches between communication and blocking of the indirect supply oil passage 68 is provided in the middle of the indirect supply oil passage 68. In the integrated pump device 905 of the fifth embodiment, an orifice 693 for narrowing the flow passage diameter of the indirect supply oil passage 68 is provided in the middle of the indirect supply oil passage 68. In the fourth and fifth embodiments, the amount of oil for cooling or lubrication supplied to the MG 39 is adjusted, and backflow is prevented.

Here, even if oil leakage occurs from the supply switching valve 692 or the orifice 693 provided in the middle of the indirect supply oil passage 68, the oil pressure supply from the oil pump 30 to the hydraulic parking lock actuator 60 is not affected. Therefore, malfunction of the hydraulic parking lock actuator 60 can be prevented and reliability is improved.

FIGS. 11 to 14 illustrate the configuration of the third embodiment that includes the oil pump 30 that is capable of forward and reverse and a suction check valves 57, 58 as a configuration for switching the operating direction of the hydraulic parking lock actuator 60. Instead of this configuration, the supply switching valve 692 or the orifice 693 may be provided in the middle of the indirect supply oil passage 68 of the first and second embodiments.

[Integrated Pump Device Using Cylinder Type Actuator]

Figure 15:
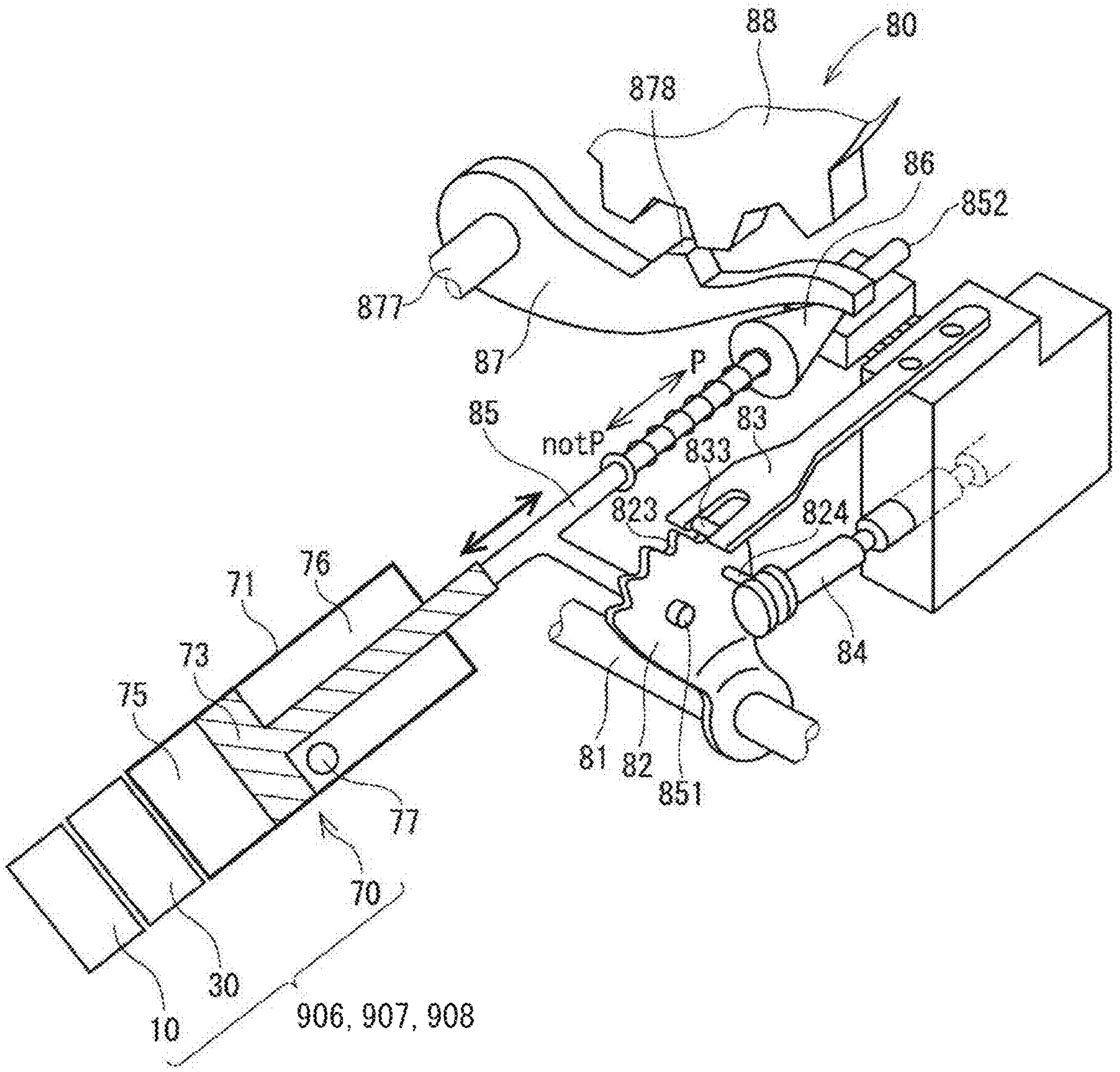
FIG. 15 is a configuration diagram of an integrated pump device and a parking lock mechanism using a cylinder type actuator according to the sixth to eighth embodiments.

Referring to FIGS. 15 to 22, the integrated pump devices 906 to 908 in which the hydraulic parking lock actuator is constituted by the cylinder type actuator 70 will be described. FIG. 15 shows the integrated pump devices 906 to 908 and the parking lock mechanism 80. The integrated pump devices 906 to 908 include the motor 10, the oil pump 30, and the cylinder type actuator 70 that are integrated together. In FIG. 15, the motor 10, the oil pump 30, and the hydraulic actuator 70 are arranged coaxially and in series and integrally constructed, but they may be arranged in series and integrally constructed with their axes shifted, or may be arranged in parallel and integrally constructed.

The cylinder type hydraulic actuator 70 includes a cylinder 71 and a piston 73 that reciprocates in the cylinder 71. An advance chamber 75 is provided in an area of the cylinder 71 in the axial direction of the piston 73, and the retard chamber 76 is provided in another area of the cylinder 71 in the axial direction of the piston 73. The cylinder 71 has a communication port 77 formed in the middle of a movement direction between the advance chamber 75 and the retard chamber 76. As shown in FIGS. 17 to 22, the communication port 77 communicates with the indirect supply oil passage 68, and is connected to the MG 39 via the indirect supply oil passage 68.

As indicated by a thick arrow in FIG. 15, the piston 73 is connected to a parking rod 85 of the parking lock mechanism 80. The parking rod 85 moves in accordance with the reciprocating movement of the piston 73, thereby switching between the P range and the not P range. In this example, the state in which the piston 73 is advanced is the advance state in which a locking operation is performed, and the state in which the piston 73 is retreated is the retard state in which an unlocking operation is performed. In other words, the advance chamber 75 is formed on the base end side of the piston 73, and the retard chamber 76 is formed on a rod tip side of the piston 73.

Figure 16:
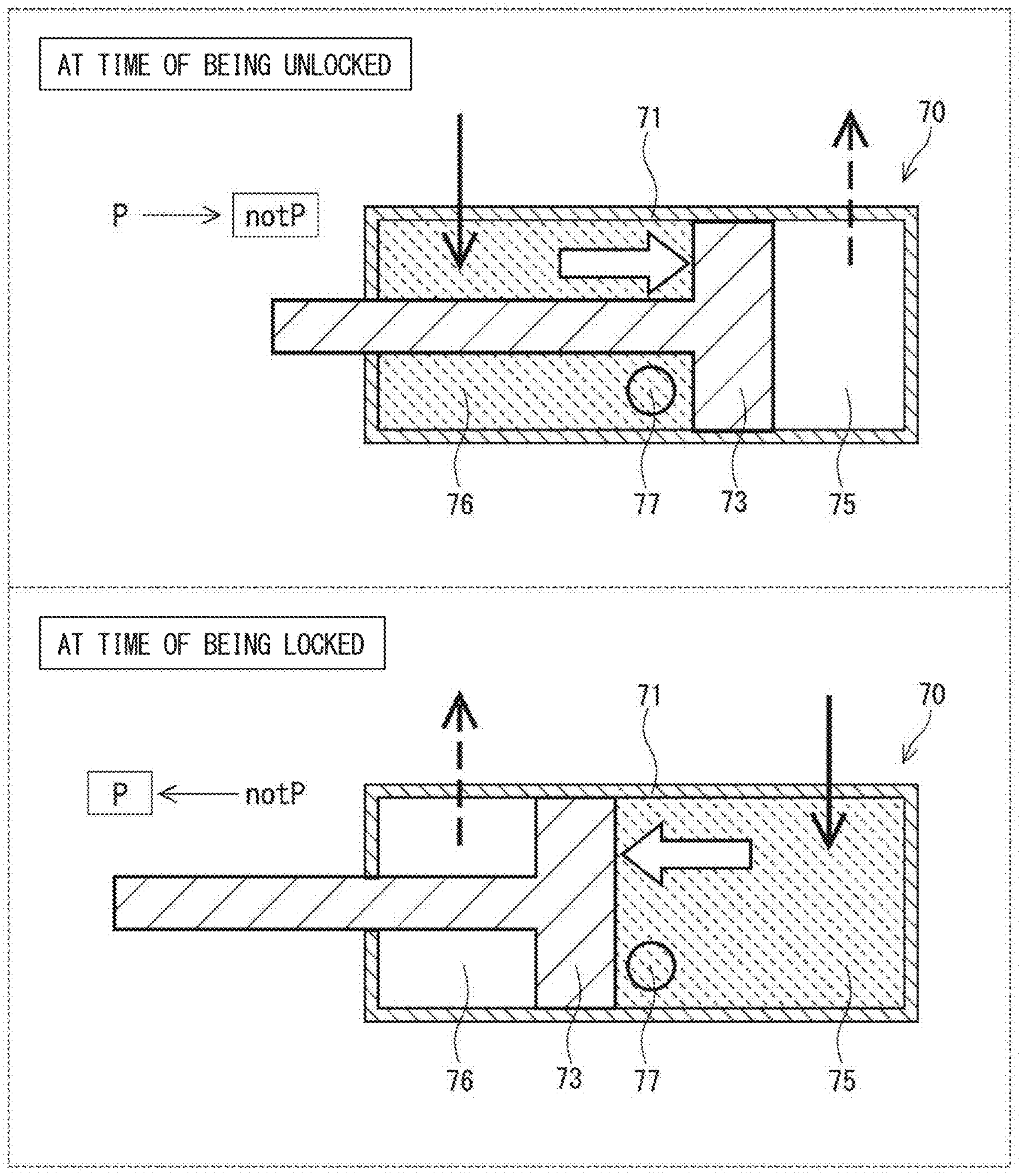
FIG. 16 is a schematic diagram of a cylinder type actuator at the time of being unlocked (retard state) and locked (advance state)
Figure 17:
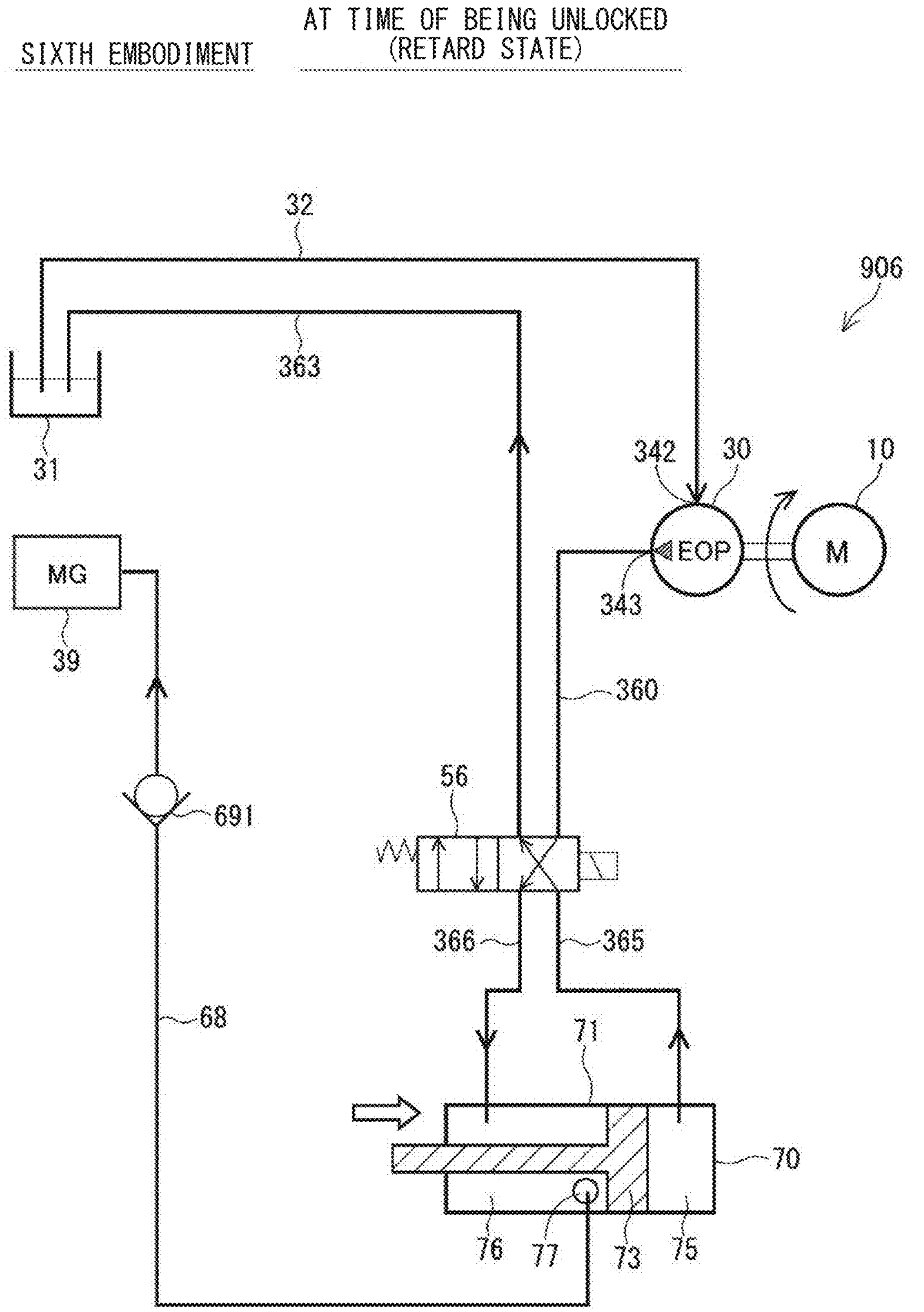
FIG. 17 is a diagram showing a hydraulic path at the time of being unlocked (retard state) according to the sixth embodiment.
Figure 18:
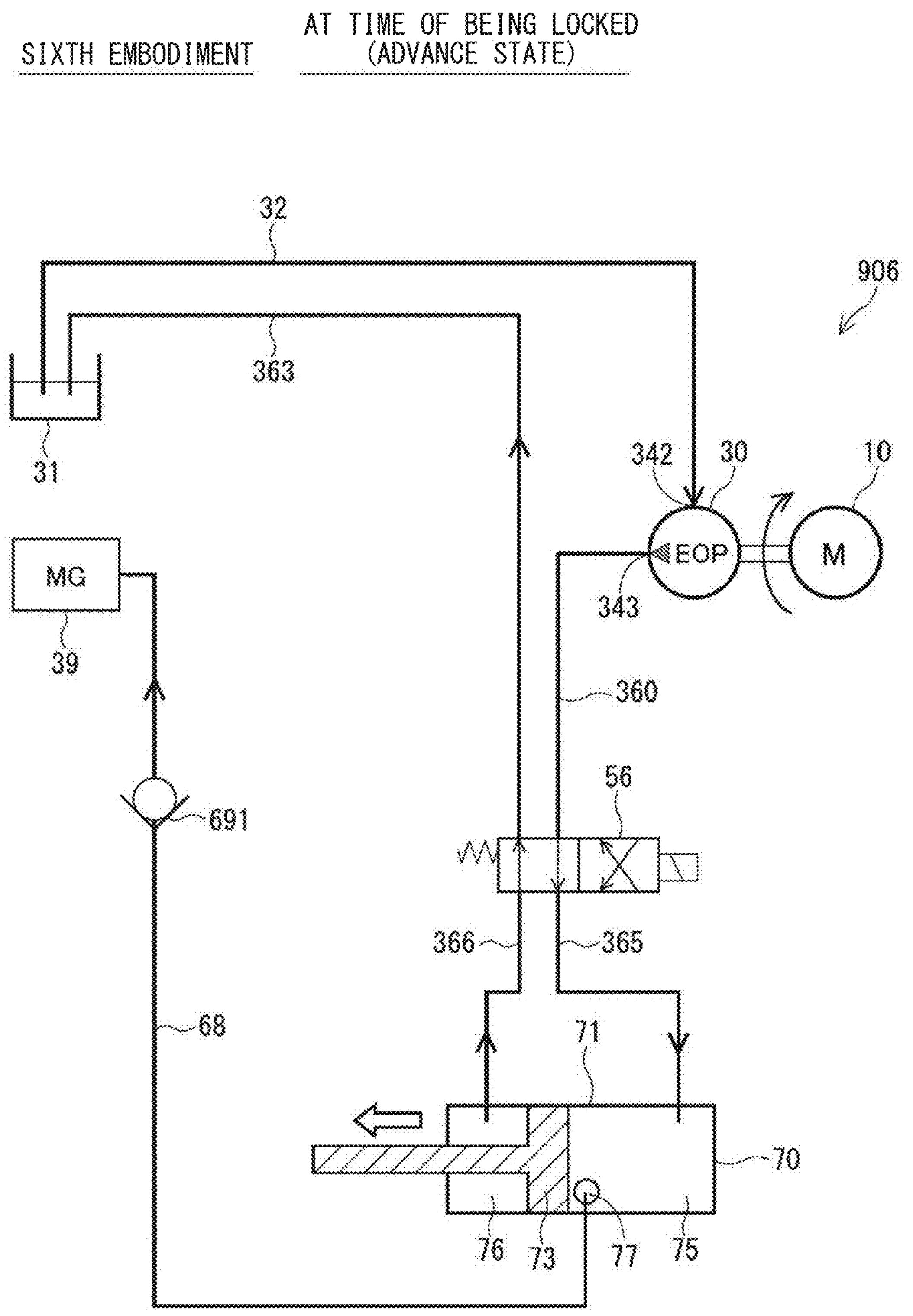
FIG. 18 is a diagram showing a hydraulic path at the time of being locked (advance state) according to the sixth embodiment.
Figure 19:
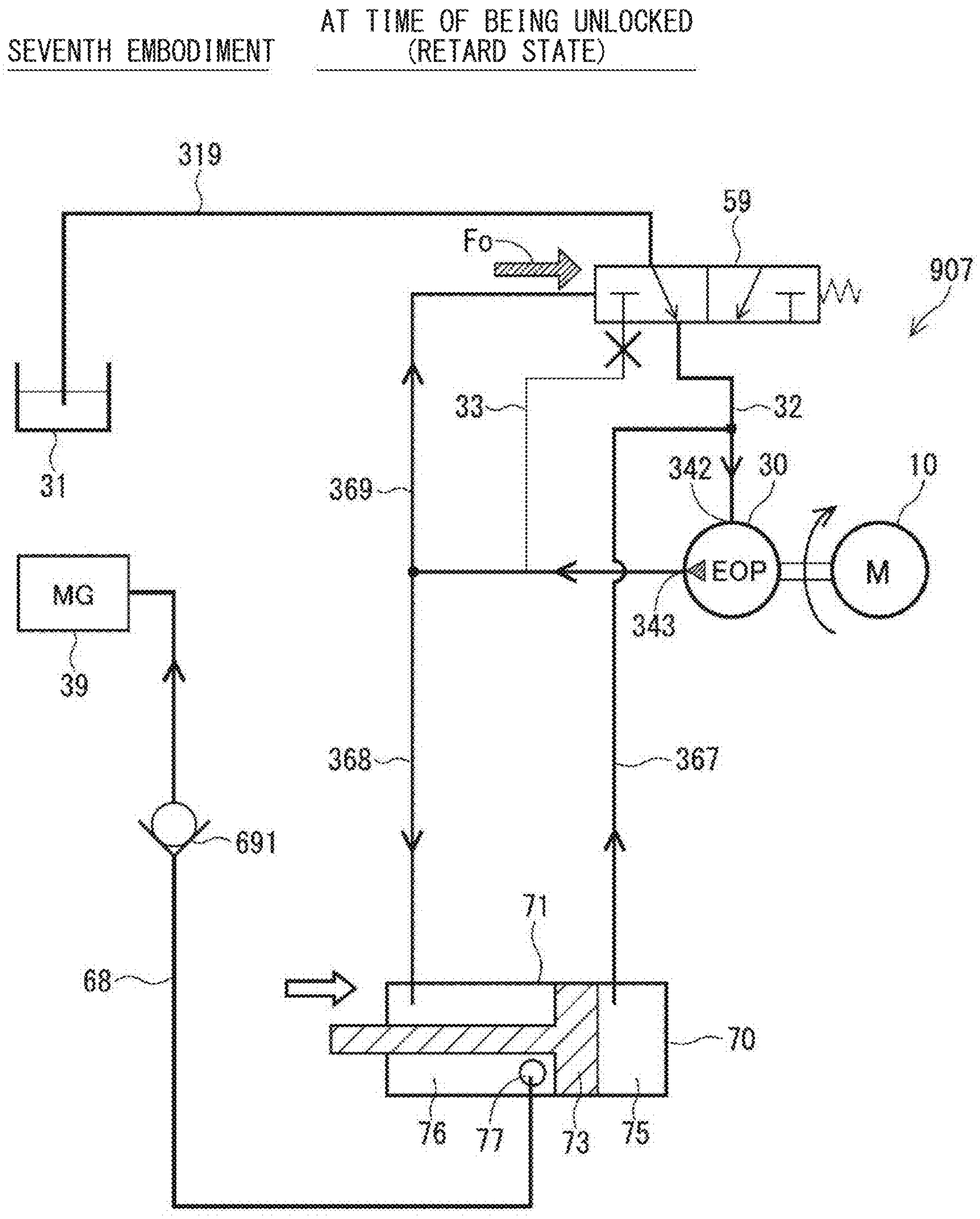
FIG. 19 is a diagram showing a hydraulic path at the time of being unlocked (retard state) according to the seventh embodiment.
Figure 20:
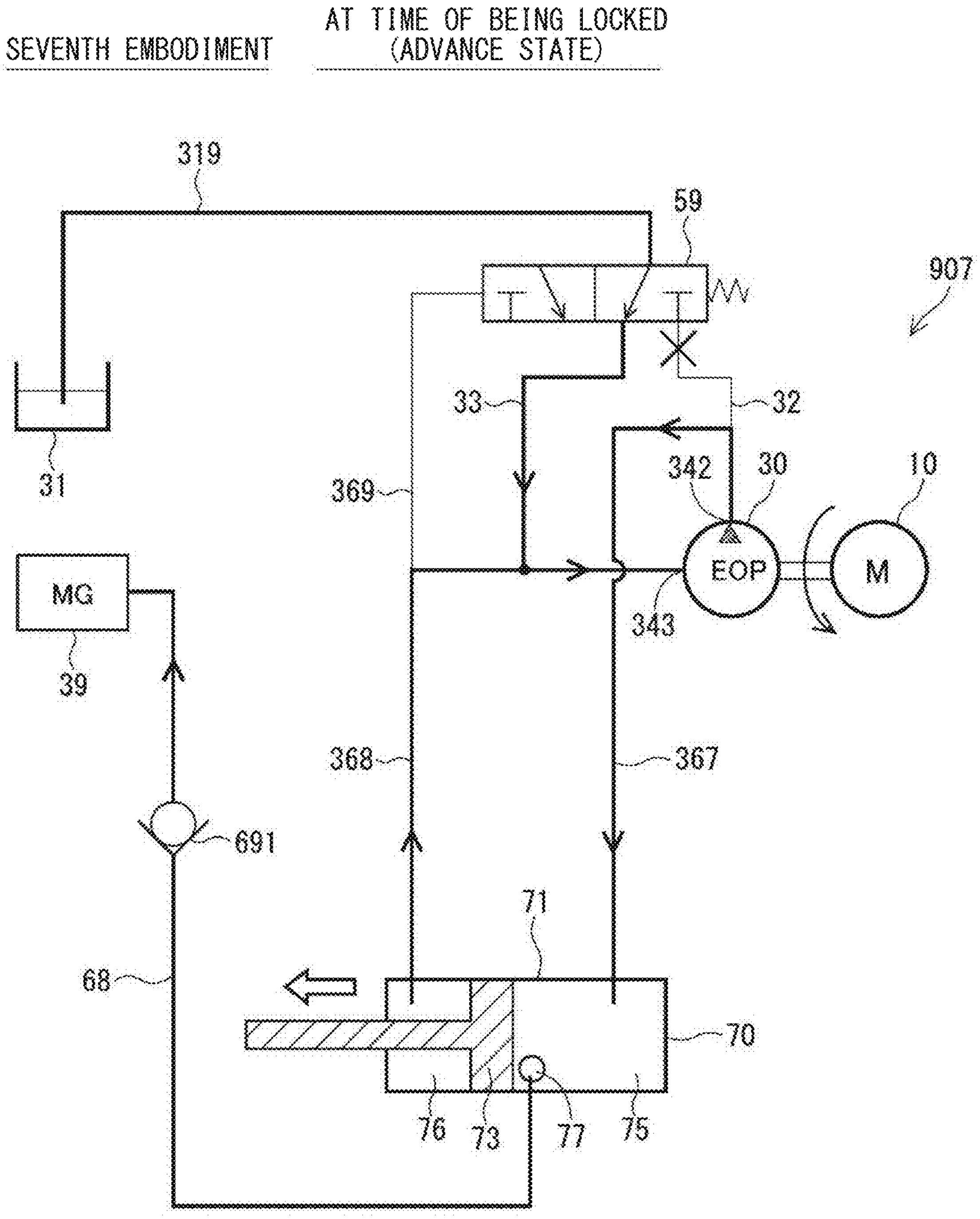
FIG. 20 is a hydraulic path diagram at the time of being locked (advance state) according to the seventh embodiment.
Figure 21:
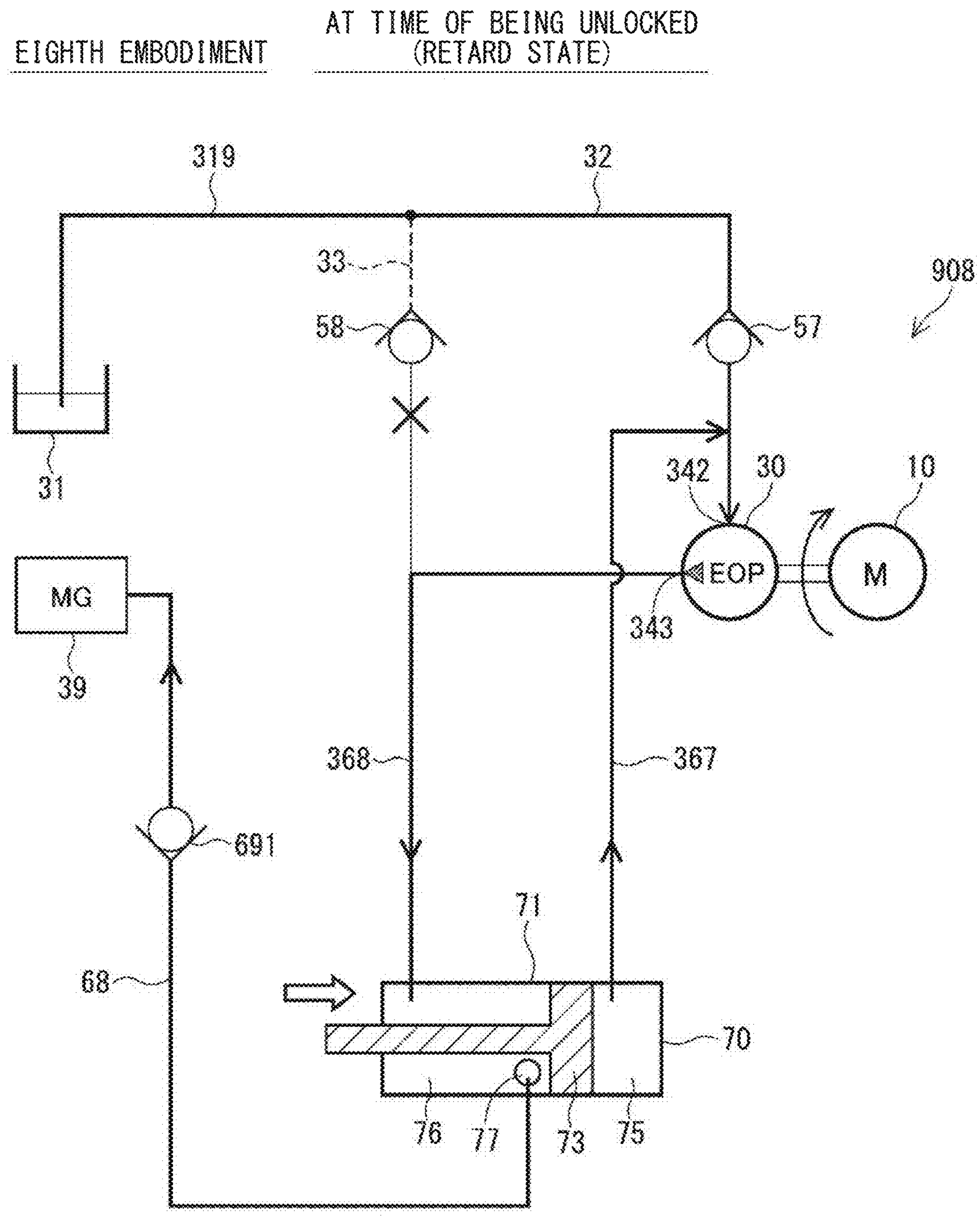
FIG. 21 is a diagram showing a hydraulic path at the time of being unlocked (retard state) according to the eighth embodiment.
Figure 22:
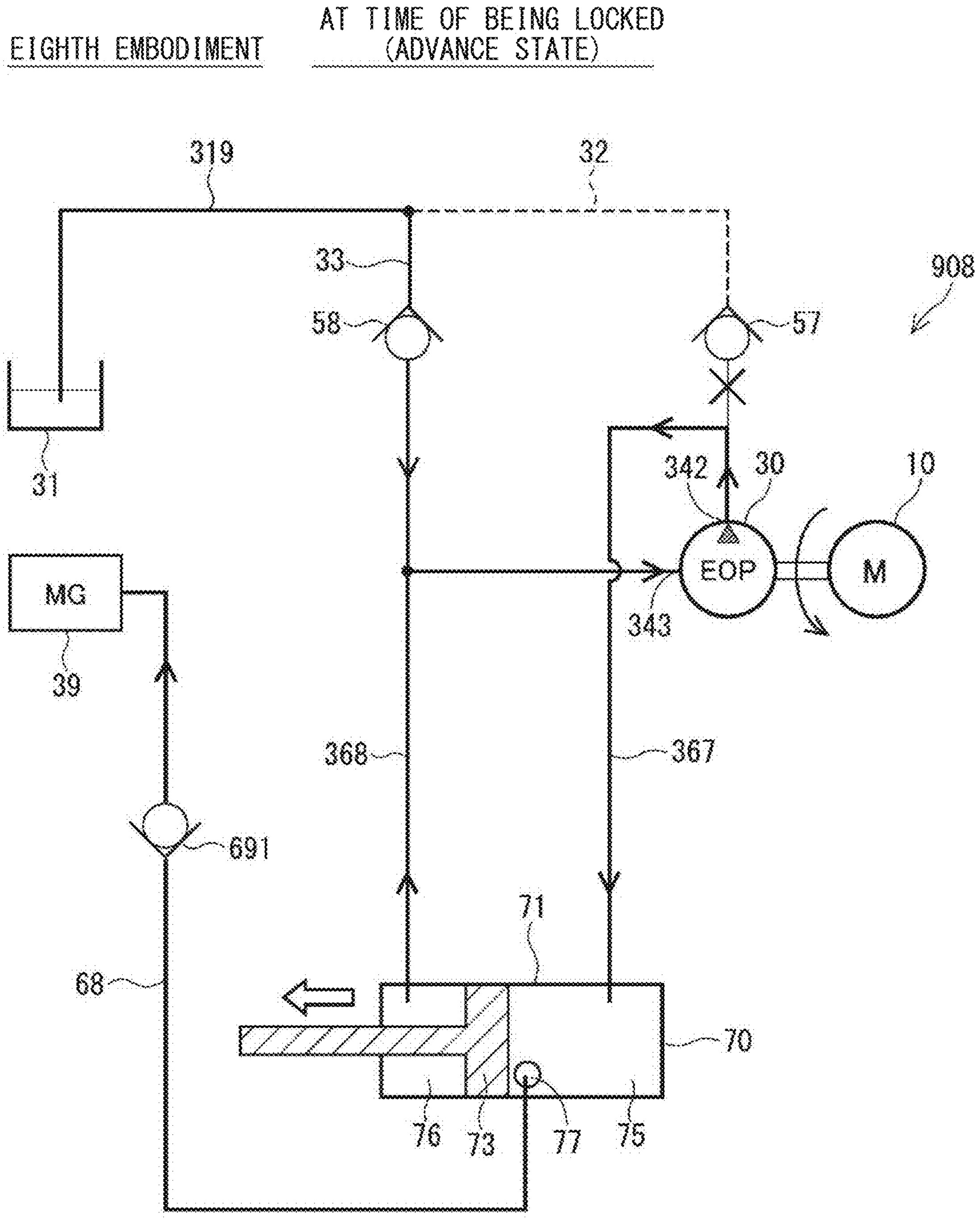
FIG. 22 is a hydraulic path diagram at the time of being locked (advance state) according to the eighth embodiment.

At the time of being unlocked as shown in the upper part of FIG. 16, the hydraulic pressure is supplied to the retard chamber 76 indicated with dashed hatching. Therefore, the piston 73 moves to the right in the figure and is in the retard state, and the parking lock mechanism 80 is unlocked. The oil is discharged from the advance chamber 75. Here, the state at the time of being unlocked is also the initial state of the movement of the piston 73 at the time of being locked.

At the time of being unlocked, in the initial stage of movement of the piston 73, the piston 73 closes the communication port 77 in the retard chamber 76, which is the "hydraulic chamber to which hydraulic pressure is supplied from the oil pump 30". After the piston 73 starts to move, at a certain position, the communication port 77 in the retard chamber 76 is opened. Then, at least part of the oil supplied from the oil pump 30 to the retard chamber 76 flows out from the communication port 77 and is supplied to the MG 39 via the indirect supply oil passage 68.

At the time of being unlocked as shown in the lower part of FIG. 16, the hydraulic pressure is supplied to the advance chamber 75 indicated with dashed hatching. Therefore, the piston 73 moves to the left in the figure and is in the advance state, and the parking lock mechanism 80 is locked. The oil is discharged from the retard chamber 76. Here, the state at the time of being locked is also the initial state of the movement of the piston 73 at the time of being unlocked.

At the time of being locked, in the initial stage of movement of the piston 73, the piston 73 closes the communication port 77 in the advance chamber 75, which is the "hydraulic chamber to which hydraulic pressure is supplied from the oil pump 30". After the piston 73 starts to move, at a certain position, the communication port 77 in the advance chamber 75 is opened. Then, at least part of the oil supplied from the oil pump 30 to the advance chamber 75 flows out from the communication port 77 and is supplied to the MG 39 via the indirect supply oil passage 68.

Sixth to Eighth Embodiments

FIGS. 17 to 22 show the integrated pump devices 906, 907, and 908 of sixth, seventh, and eighth embodiments using the cylinder type actuator 70. Each of the sixth, seventh and eighth embodiments correspond to each of the first, second and third embodiments having the rotary actuator 60, and have the same configuration and effects, so that a duplicated description will be omitted. Furthermore, the consumption side check valve 691 provided in the middle of the indirect supply oil passage 68 may be replaced with a supply switching valve 692 or an orifice 693 in accordance with the fourth and fifth embodiments.

Other Embodiments (1) The oil consumer to which the oil is supplied from the oil pump 30 is not limited to the MG 39, and may be any device or component that consumes the oil for cooling or lubrication.

(2) The number of vanes of the vane rotor in the rotary actuator 60 is not limited to four as illustrated in FIG. 4, and a plurality of vanes may be provided if a pressure receiving area can be secured. The vane chamber of the housing is set according to the number of vanes. Further, a stopper for restricting rotation of a vane rotor may be provided between a vane rotor main body and the housing instead of being provided on the vane.

(3) The piston 73 of the cylinder type actuator 70 may be connected to the switching rod 84 instead of the parking rod 85. The tip of the switching rod 84 engages with a pin 824 provided on the detent plate 82. When the switching rod 84 reciprocates, the detent plate 82 rotates via the pin 824, switching between the P range and not P range. In this case, contrary to the example shown in FIG. 15, the state in which the piston 73 is retracted corresponds to the advance state in which a locking operation is performed, and the state in which the piston 73 is advanced corresponds to a retard state in which an unlocking operation is performed. In other words, an advance chamber 75 is formed on the rod tip side of the piston 73, and the retard chamber 76 is formed on the base end side of the piston 73.

The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. An integrated pump device, comprising:

a motor;

an oil pump rotated by a driving force of the motor and configured to discharge oil drawn from an oil pan; and a hydraulic parking lock actuator that operates to switch between an advance state and a retard state by hydraulic pressure supplied from the oil pump, and that locks a parking lock mechanism of an automobile in the advance state and unlocks the parking lock mechanism in the retard state; wherein the motor, the oil pump and the hydraulic parking lock actuator are integrated to configure an integrated module, the hydraulic parking lock actuator is connected to an oil consumer via an indirect supply oil passage, and the oil pump is configured to supply oil for cooling or lubrication to the oil consumer through the hydraulic parking lock actuator.

2. An integrated pump device, comprising;

a motor, an oil pump rotated by a driving force of the motor and configured to discharge oil drawn from an oil pan; and a hydraulic parking lock actuator that operates to switch between an advance state and a retard state by hydraulic pressure supplied from the oil pump, and that locks a parking lock mechanism of an automobile in the advance state and unlocks the parking lock mechanism in the retard state; wherein the motor, the oil pump and the hydraulic parking lock actuator are integrated to configure an integrated module, the hydraulic parking lock actuator is connected to an oil consumer via an indirect supply oil passage, the oil pump is configured to supply oil for cooling or lubrication to the oil consumer via the hydraulic parking lock actuator;

the hydraulic parking lock actuator includes:

a housing including one or more vane chambers, and a vane rotor accommodated in the housing and provided with one or more vanes corresponding to the vane chamber, in the hydraulic parking lock actuator, an advance chamber is provided in an area of the vane chamber in a circumferential direction of the vane, and a retard chamber is provided in another area of the vane chamber in the circumferential direction, the hydraulic parking lock actuator is a rotary actuator in which the vane rotor is configured to rotate in one direction to enter the advance state when the hydraulic pressure is supplied to the advance chamber, and to rotate in other direction to enter the retard state when the hydraulic pressure is supplied to the retard chamber, at least one of the vane chambers includes a communication port communicating with the indirect supply oil passage at a position between the advance chamber and the retard chamber in the circumferential direction, at an initial stage of rotation of the vane rotor, the vane closes the communication port in a hydraulic chamber to which hydraulic pressure is supplied from the oil pump, and when the communication port is opened in a hydraulic chamber to which the hydraulic pressure is supplied from the oil pump after the vane rotor starts to rotate, the vane is made to supply the oil, delivered from the oil pump to the hydraulic parking lock actuator, to the oil consumer via the indirect supply oil passage.

3. An integrated pump device, comprising:

a motor;

an oil pump rotated by a driving force of the motor and configured to discharge oil drawn from an oil pan; and a hydraulic parking lock actuator that operates to switch between an advance state and a retard state by hydraulic pressure supplied from the oil pump, and that locks a parking lock mechanism of an automobile in the advance state and unlocks the parking lock mechanism in the retard state: wherein the motor, the oil pump and the hydraulic parking lock actuator are integrated to configure an integrated module, the hydraulic parking lock actuator is connected to an oil consumer via an indirect supply oil passage, the oil pump is configured to supply oil for cooling or lubrication to the oil consumer via the hydraulic parking lock actuator;

the hydraulic parking lock actuator includes:

a cylinder, and a piston configured to reciprocate within the cylinder, in the hydraulic parking lock actuator, an advance chamber is provided in an area of the cylinder in an axial direction of the piston, and a retard chamber is provided in another area of the cylinder in the axial direction of the piston, the hydraulic parking lock actuator is a cylinder type actuator in which the piston is configured to move in one direction to enter the advance state when the hydraulic pressure is supplied to the advance chamber, and to move in other direction to enter the retard state when the hydraulic pressure is supplied to the retard chamber, the cylinder has a communication port formed in a middle portion in a moving direction between the advance chamber and the retard chamber, the communication port being in communication with the indirect supply oil passage, at an initial stage of movement of the cylinder, the piston closes the communication port in a hydraulic chamber to which hydraulic pressure is supplied from the oil pump, and when the communication port is opened in the hydraulic chamber to which the hydraulic pressure is supplied from the oil pump after the cylinder starts to move, the oil delivered from the oil pump to the hydraulic parking lock actuator is supplied to the oil consumer via the indirect supply oil passage.

4. The integrated pump device according to claim 2, further comprising, a directional switching valve configured to switch a flow of the oil flowing into the advance chamber or into the retard chamber from the oil pump.

5. The integrated pump device according to claim 2, wherein, the oil pump is configured to rotate in a forward direction and a reverse direction, and to have a suction port and a discharge port which are alternatively replaced in the forward direction and in the reverse direction, a forward suction port which functions as the discharge port while the oil pump rotates in the reverse direction is connected to the advance chamber, a reverse suction port which functions as the discharge port while the oil pump rotates in the forward direction is connected to the retard chamber, a selective shutoff valve is configured:

(i) to change in a direction of a flow of the oil between a forward oil intake passage connecting the forward suction port to the oil pan and a reverse oil intake passage connecting the reverse suction port to the oil pan, (ii) to allow the oil to flow in the forward oil intake passage while the oil pump rotates in the forward direction and to block the oil to flow in the reverse oil intake passage, and (iii) to allow the oil to flow in the reverse oil intake passage while the oil pump rotates in the reverse direction and to block the oil to flow in the forward oil intake passage, and the oil pump is switched between the forward direction and the reverse direction, and the switching valve is switched in response to the oil pump, to switch a flow of the oil from the oil pump to the advance chamber or the retard chamber.

6. The integrated pump device according to claim 2, wherein, the oil pump is configured to rotate in a forward direction and a reverse direction, and to have a suction port and a discharge port which are alternatively replaced in the forward direction and in the reverse direction, a forward suction port which functions as the discharge port while the oil pump rotates in the reverse direction is connected to the advance chamber, a reverse suction port which functions as the discharge port while the oil pump rotates in the forward direction is connected to the retard chamber, first and second suction check valves are configured to prevent the oil flowing from the oil pump to the oil pan, the first suction check valve is provided in a forward oil intake passage connected to the forward suction port, the second suction check valve is provided in a reverse oil intake passage connected to the reverse suction port, and the oil pump is switched between the forward direction and the reverse direction, to switch a flow of the oil from the oil pump to the advance chamber or the retard chamber.

7. The integrated pump device according to claim 2, wherein, in a middle of the indirect supply oil passage, a consumption-side check valve for preventing a backflow of oil from the oil consumer to the hydraulic parking lock actuator, a supply switching valve for switching between communication and blocking of the indirect supply oil passage, or an orifice for restricting a flow path diameter of the indirect supply oil passage is provided.

8. The integrated pump device according to claim 3, further comprising, a directional switching valve configured to switch a flow of the oil flowing into the advance chamber or into the retard chamber from the oil pump.

9. The integrated pump device according to claim 3, wherein, the oil pump is configured to rotate in a forward direction and a reverse direction, and to have a suction port and a discharge port which are alternatively replaced in the forward direction and in the reverse direction, a forward suction port which functions as the discharge port while the oil pump rotates in the reverse direction is connected to the advance chamber, a reverse suction port which functions as the discharge port while the oil pump rotates in the forward direction is connected to the retard chamber, a selective shutoff valve is configured:

(i) to change in a direction of a flow of the oil between a forward oil intake passage connecting the forward suction port to the oil pan and a reverse oil intake passage connecting the reverse suction port to the oil pan, (ii) to allow the oil to flow in the forward oil intake passage while the oil pump rotates in the forward direction and to block the oil to flow in the reverse oil intake passage, and (iii) to allow the oil to flow in the reverse oil intake passage while the oil pump rotates in the reverse direction and to block the oil to flow in the forward oil intake passage, and the oil pump is switched between the forward direction and the reverse direction, and the switching valve is switched in response to the oil pump, to switch a flow of the oil from the oil pump to the advance chamber or the retard chamber.

10. The integrated pump device according to claim 3, wherein, the oil pump is configured to rotate in a forward direction and a reverse direction, and to have a suction port and a discharge port which are alternatively replaced in the forward direction and in the reverse direction, a forward suction port which functions as the discharge port while the oil pump rotates in the reverse direction is connected to the advance chamber, a reverse suction port which functions as the discharge port while the oil pump rotates in the forward direction is connected to the retard chamber, first and second suction check valves are configured to prevent the oil flowing from the oil pump to the oil pan, the first suction check valve is provided in a forward oil intake passage connected to the forward suction port, the second suction check valve is provided in a reverse oil intake passage connected to the reverse suction port, and the oil pump is switched between the forward direction and the reverse direction, to switch a flow of the oil from the oil pump to the advance chamber or the retard chamber.

11. The integrated pump device according to claim 3, wherein, in a middle of the indirect supply oil passage, a consumption-side check valve for preventing a back-flow of oil from the oil consumer to the hydraulic parking lock actuator, a supply switching valve for switching between communication and blocking of the indirect supply oil passage, or an orifice for restricting a flow path diameter of the indirect supply oil passage is provided.

* * * * *